United States Patent
Matsumura

(10) Patent No.: US 8,335,965 B2
(45) Date of Patent: Dec. 18, 2012

(54) SEMICONDUCTOR DEVICE AND METHOD OF CONTROLLING THE SAME

(75) Inventor: Hidetoshi Matsumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 910 days.

(21) Appl. No.: 12/196,050

(22) Filed: Aug. 21, 2008

(65) Prior Publication Data

US 2009/0063927 A1 Mar. 5, 2009

(30) Foreign Application Priority Data

Aug. 28, 2007 (JP) .................. 2007-221889

(51) Int. Cl.
*G06F 11/00* (2006.01)
(52) U.S. Cl. ...................................... 714/763
(58) Field of Classification Search ................. 714/763
See application file for complete search history.

(56) References Cited

U.S. PATENT DOCUMENTS

| | | | |
|---|---|---|---|
| 7,191,389 B1 * | 3/2007 | Eryurtlu .................... 714/819 |
| 7,555,045 B2 * | 6/2009 | Kono et al. ............. 375/240.25 |
| 7,738,561 B2 * | 6/2010 | Huang et al. ............ 375/240.27 |
| 2005/0259690 A1 * | 11/2005 | Garudadri et al. ............ 370/477 |
| 2006/0051068 A1 * | 3/2006 | Gomila ........................ 386/114 |
| 2006/0188025 A1 * | 8/2006 | Hannuksela ............ 375/240.27 |

FOREIGN PATENT DOCUMENTS

| | | |
|---|---|---|
| JP | 2001-119693 A | 4/2001 |
| JP | 2001-148859 A | 5/2001 |
| JP | 2004-320252 A | 11/2004 |
| JP | 2007-067664 A | 3/2007 |

* cited by examiner

*Primary Examiner* — Bryce Bonzo
(74) *Attorney, Agent, or Firm* — Arent Fox LLP

(57) ABSTRACT

A decoding section for decoding inputted first data; a first memory for being adapted to store second data obtained by decoding the first data; a second memory for being adapted to store error information on an error in decoding of the first data; and an output section for outputting the second data, wherein when the output section reads and outputs the second data from the first memory, the output section reads and outputs, as data corresponding to an error of the first data, second data stored in the second memory and serving as a decoding result of the other part of the first data based on the error information stored in the second memory.

6 Claims, 25 Drawing Sheets

SEMICONDUCTOR DEVICE AND METHOD OF CONTROLLING THE SAME

BACKGROUND

1. Field

The embodiments discussed herein are directed to a semiconductor device and a method of controlling the same.

2. Description of the Related Art

Moving picture encoding schemes such as Moving Picture Experts Group (MPEG) have been widely used in various fields of digital broadcasting, Internet communications, mobile phone communications, and so on. In such moving picture encoding schemes, a decoder decodes bit stream data transmitted from an encoder and outputs the data. For example, when bit stream data is transmitted through a transmission line of radio communications, a factor such as a degraded state of communications causes an error in the bit stream data and the data including the error may be inputted to the decoder.

When such an error is detected by a decoder, the most reliable method for correcting the error is to request an encoder to resend encoded data corresponding to the error. However, making a request to resend data is not so practical in reality from various viewpoints such as keeping communication speed.

Consequently, when a decoder detects an error, the decoder has to perform a process to minimize the influence of the error. In an H.264 moving picture compression encoding scheme defined by the International Telecommunication Union-Telecommunication Standardization Sector (ITU-T) in 2003, a redundant slice is used to solve such a transmission error. Thus when an error occurs, a decoded image with a macroblock that includes the error can be recovered using the contents of a redundant slice.

When such a method cannot be used, a decoder may perform error concealment to minimize the influence of an error. Various techniques have been proposed for error concealment. Referring to FIGS. 16 to 25, a prior art technique of such error concealment will be described below.

FIGS. 16 and 17 illustrate explanatory drawings of defective blocks, which cannot be normally decoded, and image degradation blocks, which have been decoded but may have abnormal decoding results when an error is detected in a bit stream of a moving picture variable-length encoding scheme such as H.264. In FIG. 16, when the error is detected in block (macroblock) n+3 in the bit stream, the subsequent blocks before a recovery position are regarded as defective blocks that cannot be normally decoded, in consideration of the characteristics of variable length encoding. For example, when block n includes a defective bit, that is, a defective bit having caused the error detected in block n+3, there is a high probability that the picture quality of previously decoded blocks, for example, n to n+2 blocks may also be degraded.

In FIG. 17, blocks between (macro) block n+3, where the error has been detected, and the recovery position are regarded as defective blocks which cannot be normally decoded. For example, blocks n to n+2 are regarded as image degradation blocks which have been decoded but are assumed to have abnormal decoding results.

FIG. 18 illustrates an explanatory drawing of blocks where picture quality is degraded by the influence of the image degradation blocks through deblocking filtering, that is, filtering for reducing block deformations occurring on the boundaries of the blocks during encoding of an image. The following will examine the blocks which are adjacent to the image degradation blocks and have undergone deblocking filtering when the error is detected in error detection block n+3. In this case, it is assumed that picture quality is degraded also in blocks located above blocks n to n+3. In the error concealment of a decoder, it is necessary to identify blocks where picture quality is presumed to be degraded and perform error concealment on the identified blocks as on defective blocks.

FIG. 19 illustrates a structural block diagram of a moving picture decoder according to a prior art example. In FIG. 19, the decoder is made up of a control unit 100 for controlling the overall configuration, a decoding unit 101 for decoding input stream data, a frame memory 102 for storing decoded image data, a memory controller 103 for controlling exchange of image data between the decoding unit 101 and the frame memory 102, and an output unit 104 which reads, through the memory controller 103, image data having been decoded and stored in the frame memory 102, and outputs the image data as an output image.

The decoding unit 101 includes a variable length decoding section 111 for performing variable length decoding on input stream data, an inverse quantization/transformation section 112 for performing inverse quantization and inverse transformation on the output of the variable length decoding section 111, an intraframe prediction section 113 for performing intraframe prediction when an intraframe prediction scheme is used as an encoding scheme, an interframe prediction section 114 for performing interframe prediction when an interframe prediction scheme is used, a deblocking filtering section 115 for performing the foregoing deblocking filtering on decoded image data, and an adder 116 which adds the output of the inverse quantization/transformation section 112 and one of the outputs of the intraframe prediction section 113 or the interframe prediction section 117, which are switched by a switch 117, and supplies the added output to the deblocking filtering section 115.

When an error is detected in input stream data by the intraframe prediction section 113 and the interframe prediction section 114, error concealment is performed. Various schemes are available for error concealment. As one of the schemes, the following error concealment technique is available: error concealment reference images corresponding to an error detection block, defective blocks, or image degradation blocks are selected from image data having been decoded and stored in the frame memory 102, and the selected images are used instead of the image data of the image degradation blocks or the defective blocks.

In FIG. 19, when an error is detected while the intraframe prediction scheme is used as an encoding scheme, the switch 117 is switched to the interframe prediction section 114. Next, the error concealment reference images used instead of the data of defective blocks or image degradation blocks are read from the frame memory 102 through the memory controller 103. The image data of the images is added to the output of the inverse quantization/transformation section 112 by the adder 116, and is supplied to the deblocking filtering section 115. The output of the deblocking filtering section 115 is stored in the frame memory 102 through the memory controller 103 as decoding result image data corresponding to the image degradation blocks or the defective blocks. Also, when the interframe prediction scheme is used, the data of the error concealment reference images is similarly supplied to the adder 116 from the interframe prediction section 114.

FIGS. 20 to 22 illustrate control flowcharts performed by the control unit 100 of FIG. 19. FIG. 20 illustrates the flowchart of control performed on the decoding unit 101. In FIG. 20, processing on the decoding unit 101 is suspended in step S101 until free space becomes available in the frame memory 102. When free space becomes available, in step S102, the control unit 100 causes the decoding unit 101 to perform decoding on one screen, that is, decoding on one frame. In step S103, the control unit 100 manages reference images based on standards and specifications. For example, the control unit 100 performs management and so on when decoded images are used as reference images of other images in the interframe prediction scheme. After that, the processing from step S101 is repeated.

FIG. 21 illustrates the flowchart of control performed on the output unit 104. In FIG. 21, first in step S105, the control unit 100 causes the output unit 104 to wait for the output start timing, that is, the timing for reading output image data from the frame memory 102. At this timing, in step S106, an output image to be outputted from the frame memory 102 is determined based on the standards and specifications. In step S107, one-screen output image data read from the frame memory 102 through the memory controller 103 is outputted to the output unit 104. After that, the processing from step S105 is repeated.

FIG. 22 illustrates the flowchart of area release control in the frame memory 102. In step S108 of FIG. 22, the control unit 100 waits for an image which may be released based on the standards and specifications, that is, an image which may be deleted from the frame memory 102. In step S109, an area occupied by the image on the frame memory 102 is released. After that, the processing from step S108 is repeated. Whether an area may be released or not is determined by whether or not other images are unlikely to refer to the image data of the area when the image data has been outputted through the output unit 104 or when, for example, the interframe prediction scheme is used.

To explain a problem of the moving picture decoder of FIG. 19, the following will describe an example of a group-of-picture (GOP) structure indicating the decoding order and output order of image data in an input stream in accordance with FIG. 23. Referring to FIGS. 24 and 25, the following will describe a prior art example of the timing chart of decoding and output of image data according to the example of FIG. 23. FIG. 23 illustrates a GOP structure generally used in moving picture encoding schemes such as MPEG2 or H.264, illustrates the decoding order and the output order of image data in an input stream, and illustrates a reference relationship between images.

In other words, the upper part of FIG. 23 illustrates images in the input stream, that is, the decoding order corresponding to the order of pictures. The reference relationship is established as follows: an I0 picture first inputted to the GOP structure is referenced by pictures B1, B2, B4 and B5, which are subsequently inputted as B pictures, and a P3 picture inputted as a P picture, where the P3 picture is referenced by pictures B4, B5, B7 and B8 and a P6 picture, and the P6 picture is referenced by the B7 picture and the B8 picture. In FIG. 23, the pointed ends of arrows represent the referring pictures and the round ends of the arrows represent the referenced pictures.

In the picture output order of the lower part of FIG. 23, the decoding results of the B1 and B2 pictures are first outputted, and then the decoding result of the first inputted I0 picture is outputted. After that, the decoding results of the B4 and B5 pictures are outputted, and then the decoding result of the P3 picture is outputted. Further, the decoding results of the B7 and B8 pictures are outputted, and then the decoding result of the P6 picture is outputted. In this way, the output order of the decoding results is different from the order of pictures in the input stream.

Generally, when an error is detected in an input bit stream as described above and error concealment is performed also on image degradation blocks preceding an error detection block, the influence of the error on an output image can be made less noticeable by performing error concealment as reprocessing on the decoded image degradation blocks. However, reprocessing increases an amount of operations. For example, it is thought that when quite a large number of errors occur in an image (picture), the decoding time may exceed a decoding time allocated to the decoding of image data of the image because the amount of operations is increased by reprocessing.

The timing chart of FIG. 24 illustrates an example of a timing chart of decoding and outputting when errors occur in the P3 and B4 pictures of the pictures in the input stream of FIG. 23 and the images include defective blocks and image degradation blocks caused by the errors. In this example, in the decoding of the P3 picture, which is an image including the error, the I0 picture is referenced for error concealment. In the decoding of the B4 picture, the P3 picture as a result of the error concealment is referenced and error concealment is performed on the B4 picture. Further, the decoding of these two pictures requires a longer time than the decoding of other pictures. However, since the I0 picture is outputted between the B2 picture and the B4 picture, the output is correctly performed as illustrated in FIG. 23 and the decoding time increased by the error concealment does not affect the output of image data. In the lower part of FIG. 24, banks 0 to 3 represent areas in a frame memory for storing the data of a single image, that is, a single picture. In this case, when the output of data stored in each bank is completed and other pictures are unlikely to refer to the data, the data is deleted from each bank as illustrated in FIG. 22.

FIG. 25 illustrates an example of failed processing in which the decoding time of the P3 and B4 pictures exceeds the decoding time of FIG. 24 and image data output is different from that of FIG. 23. In FIG. 23, the P3 picture is decoded until the end of the output of the B2 picture and the decoding time of the B4 picture from that time is increased, so that the output of the B4 picture is late and the I0 picture is outputted twice. Consequently, the processing time for the image data output of the overall GOP configuration of FIG. 23 is increased by one picture.

As described above, in the prior art, when error concealment is performed on image degradation blocks having been decoded before an error detection block, a picture including quite a large number of errors may have a decoding time exceeding a predetermined processing time.

Japanese Patent Laid-Open No. 2001-119693 relating to error concealment in a moving picture decoder discloses a technique in which in the event of an error in decoded image data, irregularities on a displayed image are made less noticeable by simple error concealment of repeatedly displaying a currently displayed image.

Further, Japanese Patent Laid-Open No. 2004-320252 discloses a technique of reducing an amount of RGB conversion when a displayed image is generated from a decoded image in the event of an error during the decoding of the image.

However, such a prior art technique cannot solve a problem of a decoding time of an image, that is, a picture. The decoding time may exceed a predetermined processing time when error concealment is performed as reprocessing on image degradation blocks and so on which have been decoded before an error detection block.

SUMMARY

It is an aspect of the embodiments discussed herein to provide a semiconductor device, including: a decoding section for decoding inputted first data; a first memory for being adapted to store second data obtained by decoding the first data; a second memory for being adapted to store error information on an error in decoding of the first data; and an output section for outputting the second data, wherein when the output section reads and outputs the second data from the first memory, the output section reads and outputs, as data corresponding to an error of the first data, second data stored in the second memory and serving as a decoding result of the other part of the first data based on the error information stored in the second memory.

These together with other aspects and advantages which will be subsequently apparent, reside in the details of construction and operation as more fully hereinafter described and claimed, reference being made to the accompanying drawings forming a part hereof, wherein like numerals refer to like parts throughout.

DETAILED DESCRIPTION OF THE EMBODIMENTS

Figure 1:
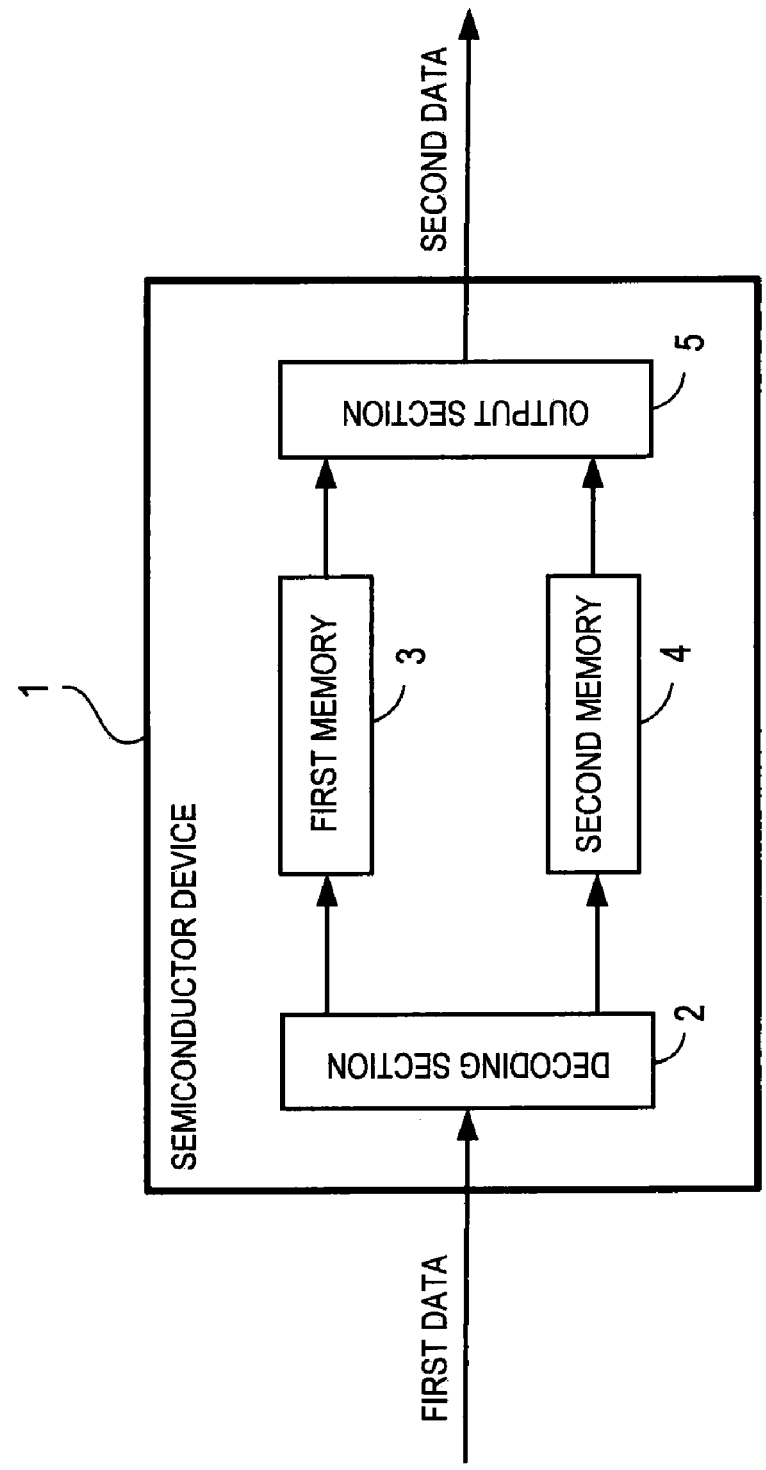
FIG. 1 illustrates a basic structural block diagram of a semiconductor device serving as a moving picture decoder.

FIG. 1 illustrates a basic configuration block diagram of a moving picture decoder serving as a semiconductor device of the present embodiment. In FIG. 1, a semiconductor device 1 includes a decoding section 2, a first memory 3, a second memory 4, and an output section 5. The semiconductor device is manufactured as, for example, an LSI chip and operates as a moving picture decoder.

The decoding section 2 corresponds to a decoding unit, which will be described later, and decodes inputted first data, that is, input stream data. The first memory 3 corresponds to a frame memory, which will be described later, and stores second data obtained by decoding the first data, that is, image data as a decoding result. The second memory 4 corresponds to an error concealment target position information holding unit, which will be described later, and stores error information about an error in the decoding of the first data. The error information indicates the position of a block where an error has been detected, the positions of defective blocks between the error detection block and a recovery position, and the positions of blocks judged as blocks requiring error concealment out of previously decoded blocks, according to the error detection block.

The output section 5 outputs the second data. When the second data is read from the first memory 3 and outputted, the output section 5 reads data stored for error concealment in the second memory 4 and outputs the data to the outside. The data for error concealment has been already decoded as data corresponding to an error of the first data, for example, an error detection block, a defective block, and an image degradation block based on the error information stored in the second memory 4.

Figure 2:
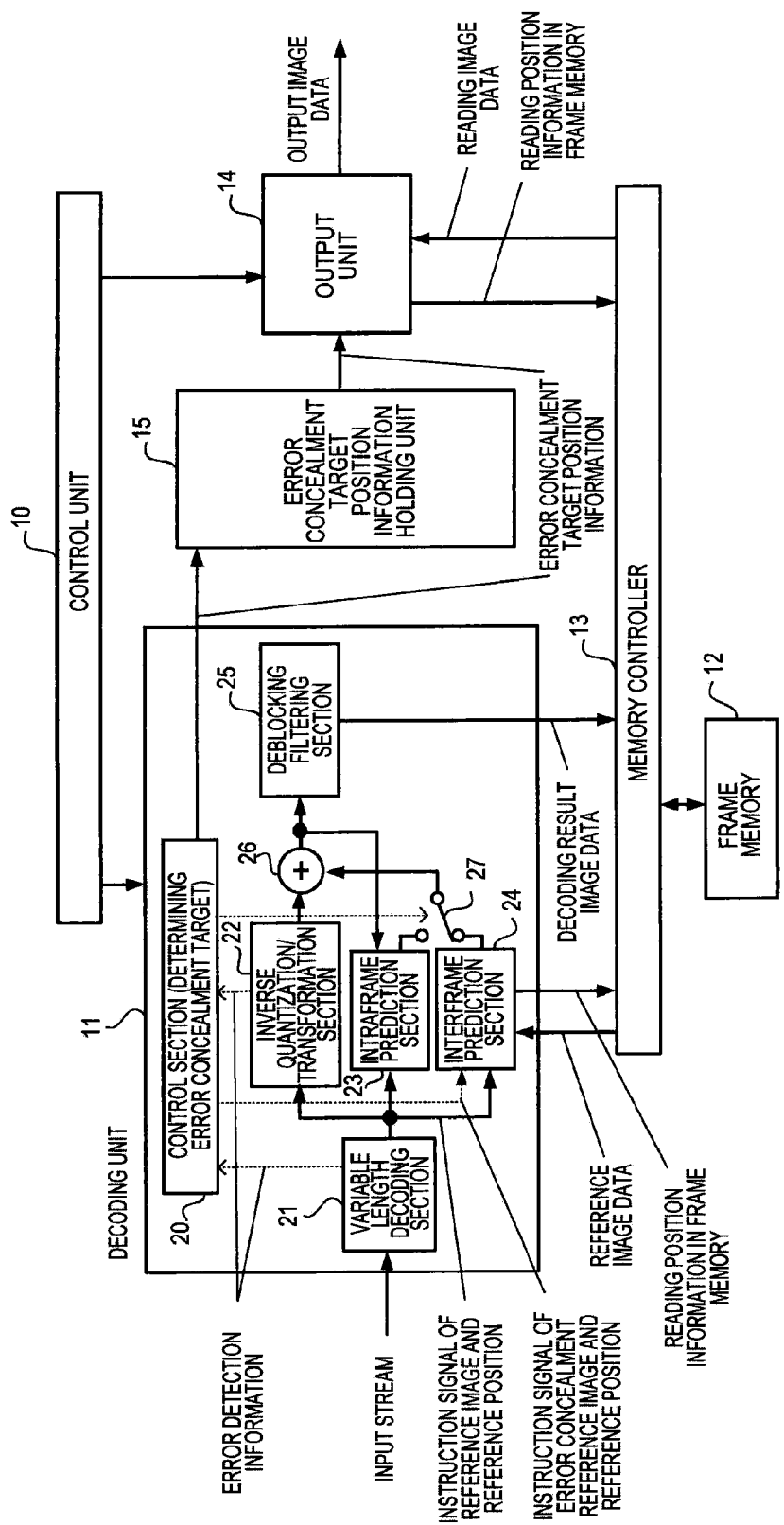
FIG. 2 illustrates a structural block diagram of a moving picture decoder according to a first embodiment.

FIG. 2 illustrates a structural block diagram of a moving picture decoder according to a first embodiment. The operations of the moving picture decoder of FIG. 2 will be specifically described below.

In FIG. 2, error detection information is supplied from a variable length decoding section 21 or an inverse quantization/transformation section 22 to a control section 20 in a decoding unit 11. An error is detected by detecting that an abnormality occurs during a variable length decoding, a residual of the result of inverse quantization/transformation falls outside the range of predetermined values, motion vector data falls out of the standard range of predetermined values, or a standard intraframe prediction mode or the like is impossible.

In response to the input of the error detection information, the control section 20 determines that the error concealment targets are a defective block, an error detection block, and blocks which have been decoded before the error detection block and are presumed to have image degradation. Further, the control section 20 stores, in an error concealment target position information holding unit 15, position information indicating the positions of these blocks. The error concealment target position information is supplied from the error concealment target position information holding unit 15 to an output unit 14 when image data is outputted from the output unit 14.

Figure 19:
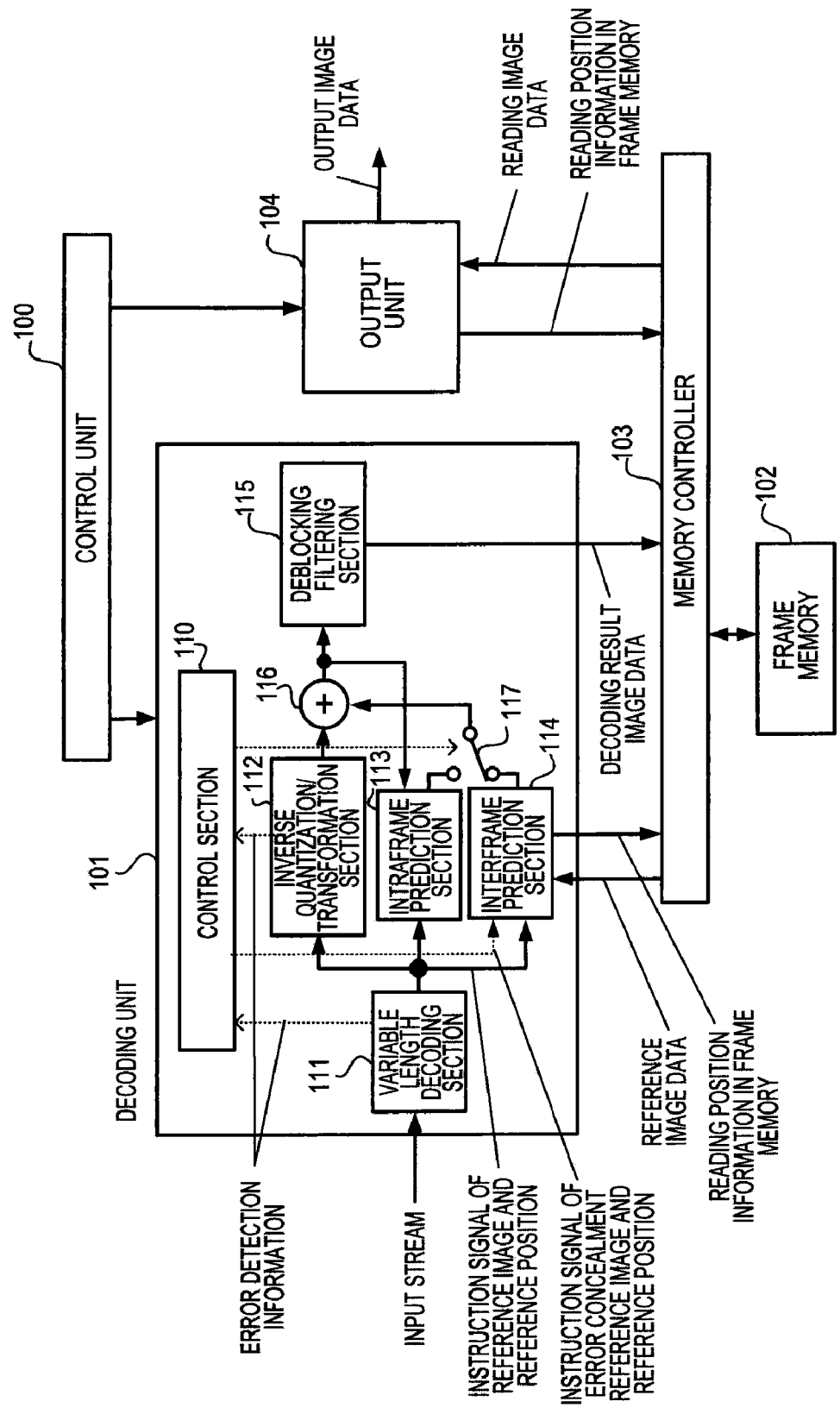
FIG. 19 illustrates a structural block diagram of a moving picture decoder according to a prior art example.
Figure 23:
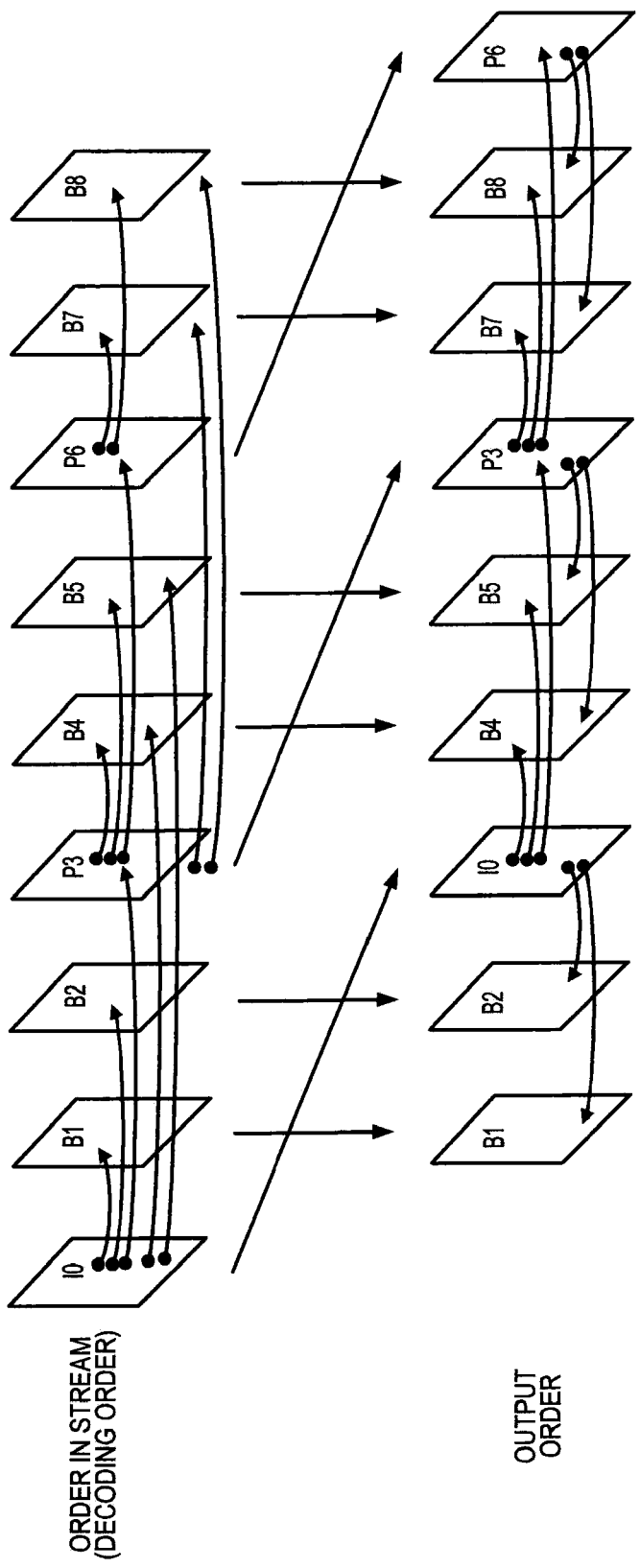
FIG. 23 illustrates an example of a group-of-picture (GOP) structure indicating a reference relationship between images.

In FIG. 2, as in the prior art example of FIG. 19, a signal indicating both a reference image necessary for interframe prediction and the reference position of the reference image is supplied from the variable length decoding section 21 to an interframe prediction section 24. Further, a signal indicating a reference image for error concealment and the reference position of the reference image is supplied from the control section 20 to the interframe prediction section 24 when necessary. In the first embodiment, for example, error concealment on reference image data required for image decoding illustrated in FIG. 23 is basically performed by the interframe prediction section 24 as in the prior art example of FIG. 19. A referenced image having undergone error concealment is stored in a frame memory through a deblocking filtering section 25 and a memory controller 13. However, even when an error occurs in the data of an image not referenced in decoding, for example, in the image data of the B4 picture of FIG. 23, error concealment is not performed in response to the error. When image data is outputted from the output unit 14, an error concealment reference image, which is stored in the frame memory 12 and corresponds to an error image, is read from the frame memory 12 regarding a processed block on a position designated by the error concealment target position information in the image data, for example, regarding an image degradation block, and then an error concealment result is outputted to the outside.

Figure 3:
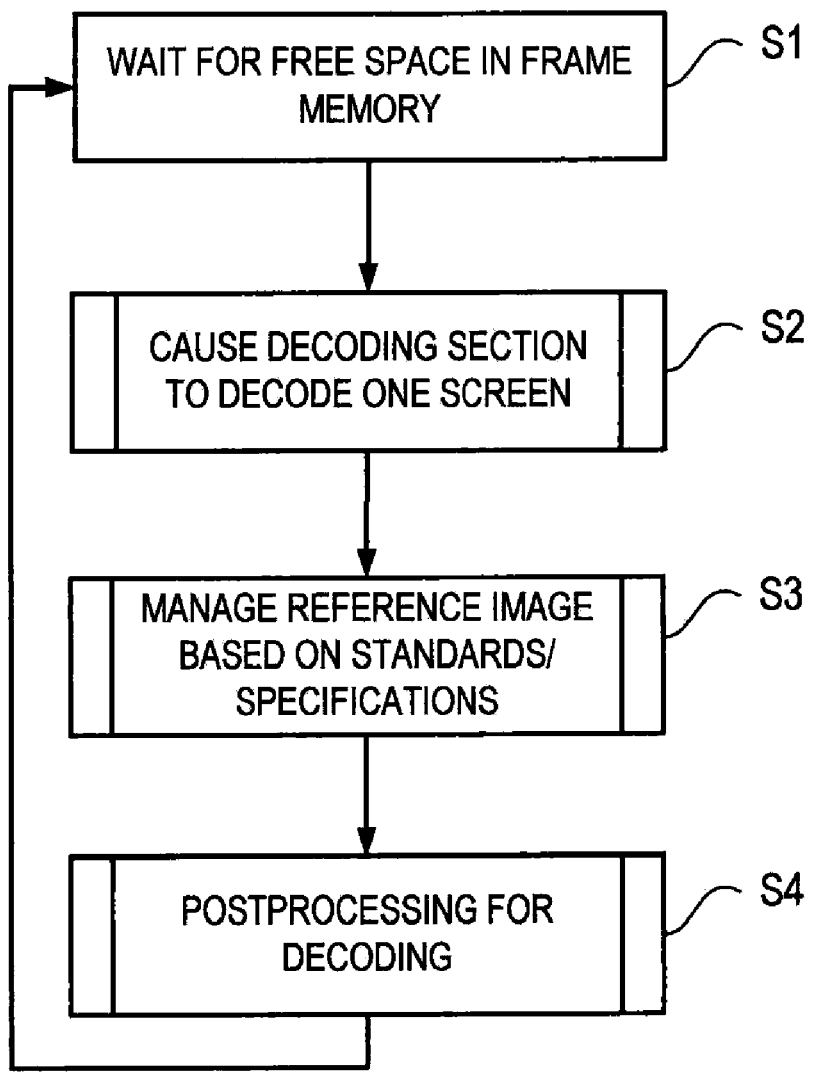
FIG. 3 illustrates a flowchart of control on a decoding unit by a control unit of FIG. 2.
Figure 20:
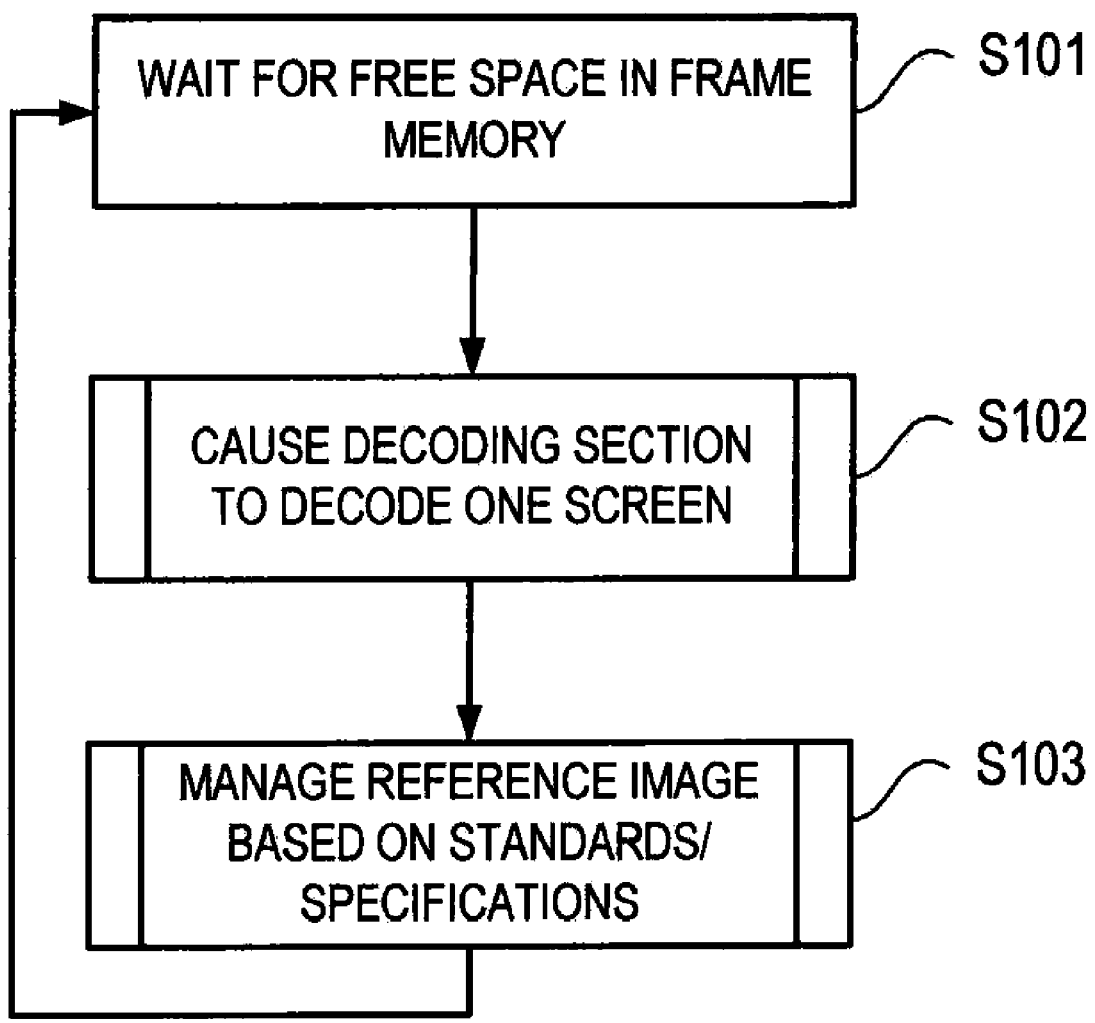
FIG. 20 illustrates a flowchart of control performed on a decoding unit of FIG. 19.
Figure 21:
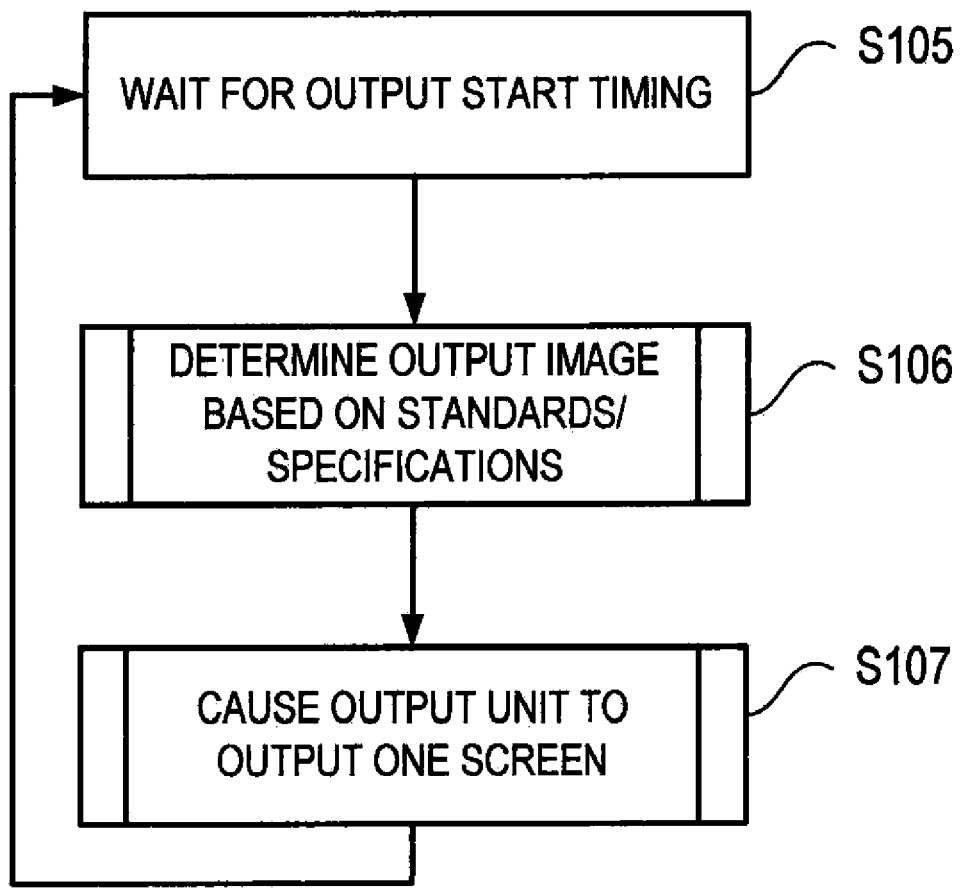
FIG. 21 illustrates a flowchart of control performed on an output unit of FIG. 19.
Figure 22:
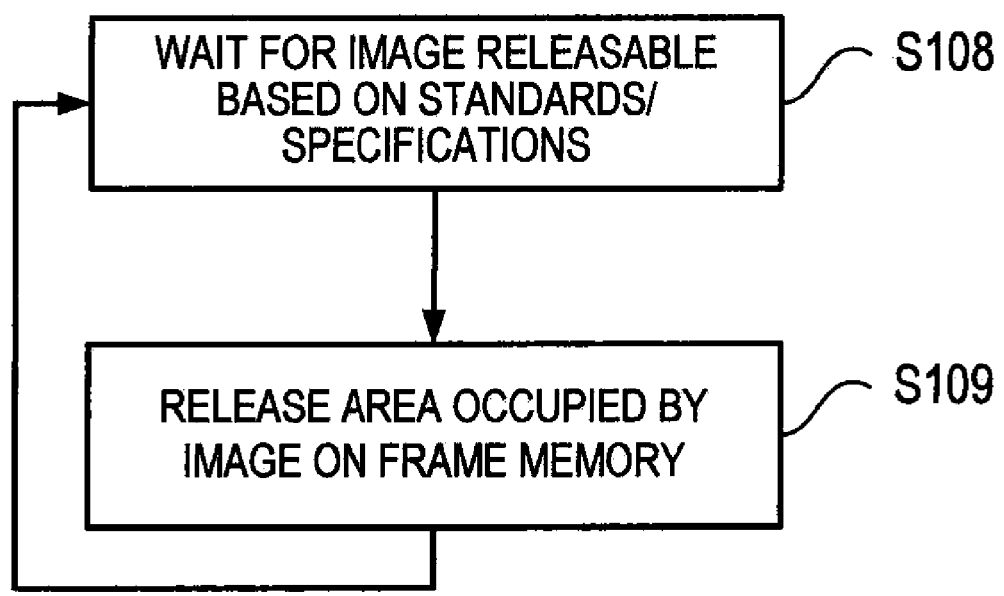
FIG. 22 illustrates a flowchart of area release control on a frame memory of FIG. 19.

FIGS. 3 to 6 illustrate flowcharts of control performed by the control unit 10 of FIG. 2 according to the first embodiment and correspond to FIGS. 20 to 22 of the prior art example. FIG. 3 illustrates the flowchart of control on the decoding unit. In FIG. 3, after steps S1 to S3 corresponding to steps S101 to S103, postprocessing for decoding is performed in step S4, and then the processing from step S1 is repeated. The postprocessing for decoding will be specifically described later.

In the management of a reference image in step S3 of the present embodiment, a flag indicating the possibility that an image stored in the frame memory 12 is referenced in decoding and a flag indicating the possibility that the image is referenced for error concealment (whether the image is being used or has been used for error concealment) are stored in the control unit 10. The values of the flags are set by the control unit 10.

Figure 4:
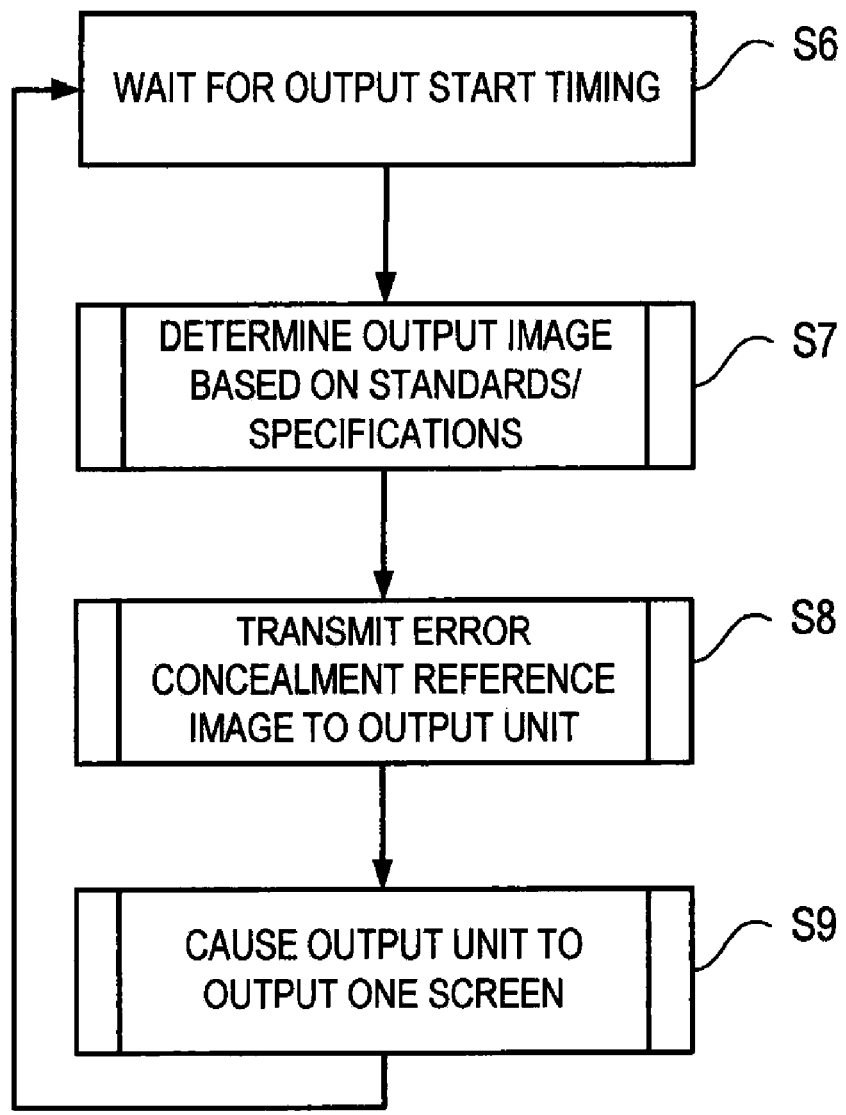
FIG. 4 illustrates a flowchart of control performed on an output unit by the control unit.

FIG. 4 illustrates a flowchart of control performed on the output unit. In FIG. 4, it may be necessary to note that reference images for error concealment are transmitted to the output unit in step S8. In FIG. 2, the error concealment target position information supplied from the error concealment target position information holding unit 15 to the output unit 14 is data indicating error concealment target images including, for example, an image degradation block and a defective block. The control unit 10 notifies the output unit 14 which pieces of image data having been decoded and stored in the frame memory 12 should be used as error concealment reference images.

In the present embodiment, a flag indicating whether or not image data stored in the frame memory 12 is placed in an output queue is stored in the control unit 10. When an output image is determined in step S7, the output image is determined using the value of the flag.

Figure 5:
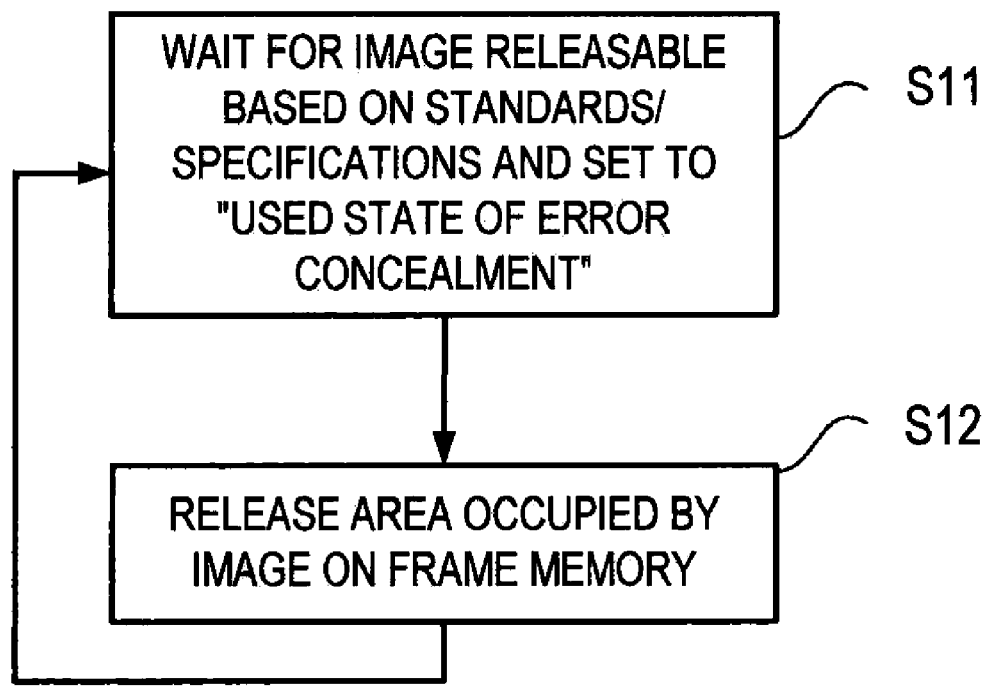
FIG. 5 illustrates a flowchart of area release control on a frame memory by the control unit.

FIG. 5 illustrates a flowchart of area release control on the frame memory 12 according to the first embodiment. In FIG. 5, it may be necessary to note that an area is released on the condition that a flag is set to a used state which indicates the possibility that an image releasable in step S11 is used not only based on standards and specifications but also for error concealment, the flag being held in the control unit 10.

Figure 6:
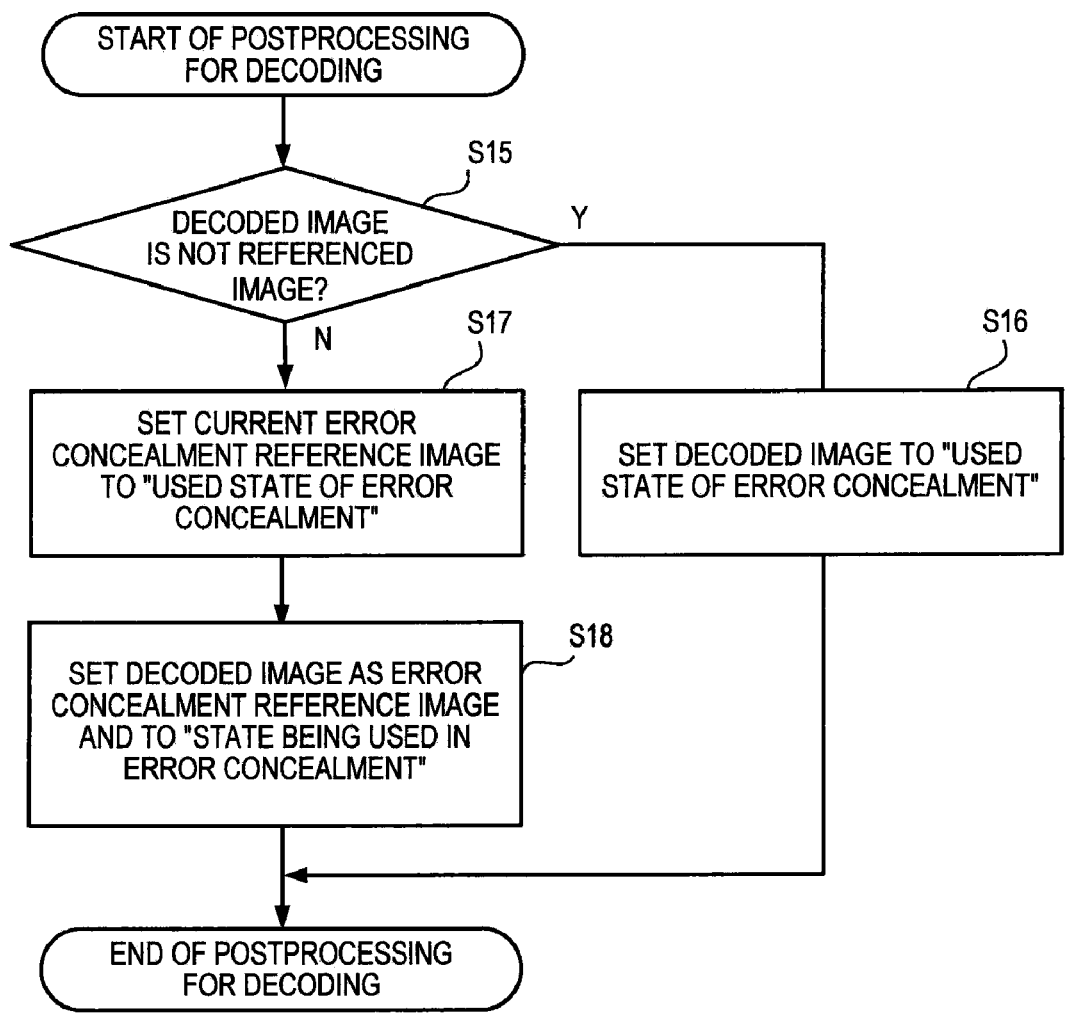
FIG. 6 illustrates a detailed flowchart of postprocessing for decoding in FIG. 3.

FIG. 6 illustrates a detailed flowchart of postprocessing for decoding of step S4 in FIG. 3. In FIG. 6, when processing is started, it is first determined in step S15 whether or not a decoded image is to be referenced in error concealment. When the image is not to be referenced, a flag for the image is set to a used state of error concealment in step S16 and the postprocessing for decoding is completed.

When it is determined in step S15 that a decoded image may be referenced for error concealment, a flag for the current reference image for error concealment is set to a used state of error concealment in step S17. In step S18, the decoded image is set as an error concealment reference image. The flag is set to a used state of error concealment and the postprocessing for decoding is completed.

Figure 7:
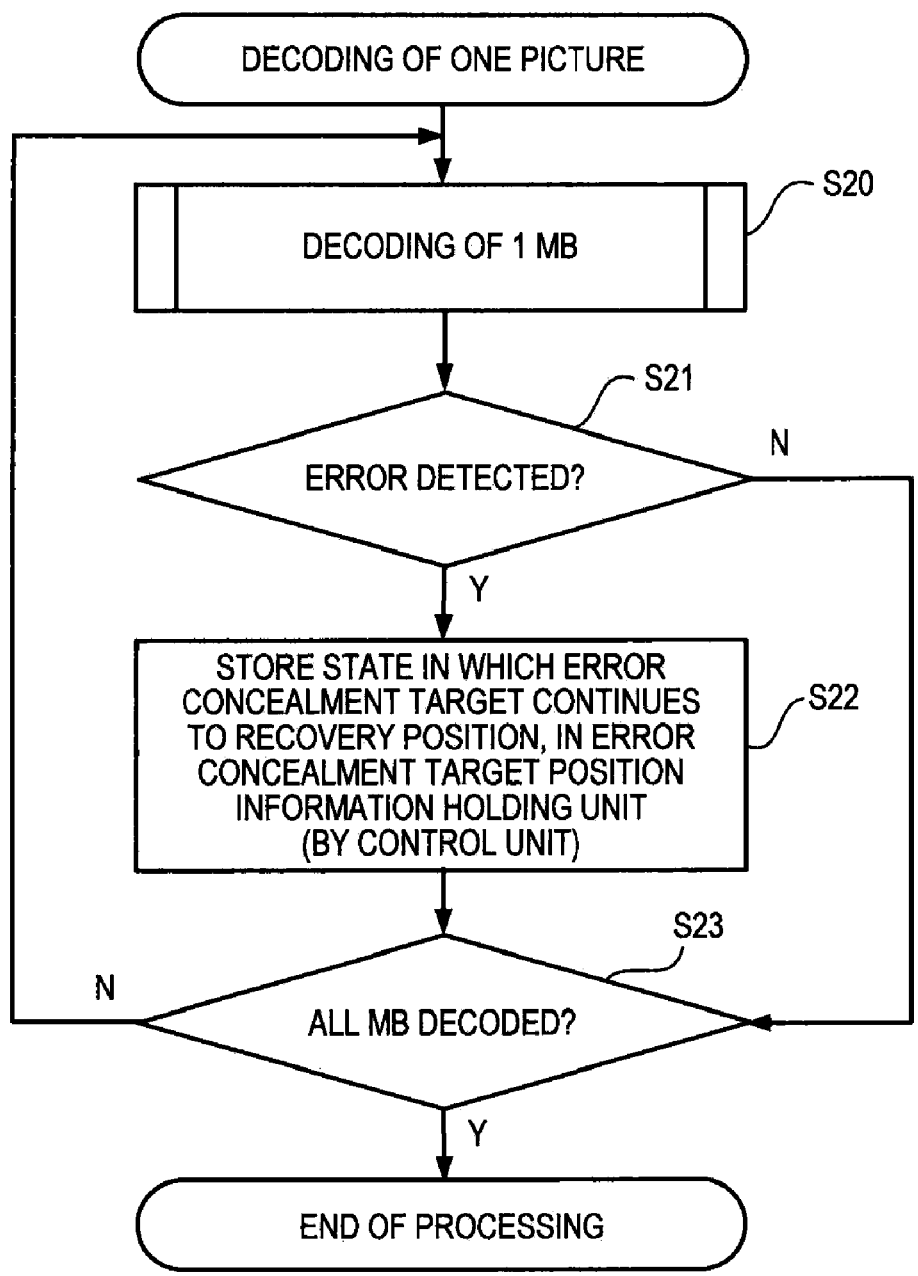
FIG. 7 illustrates a flowchart of decoding on a picture according to the first embodiment.
Figure 8:
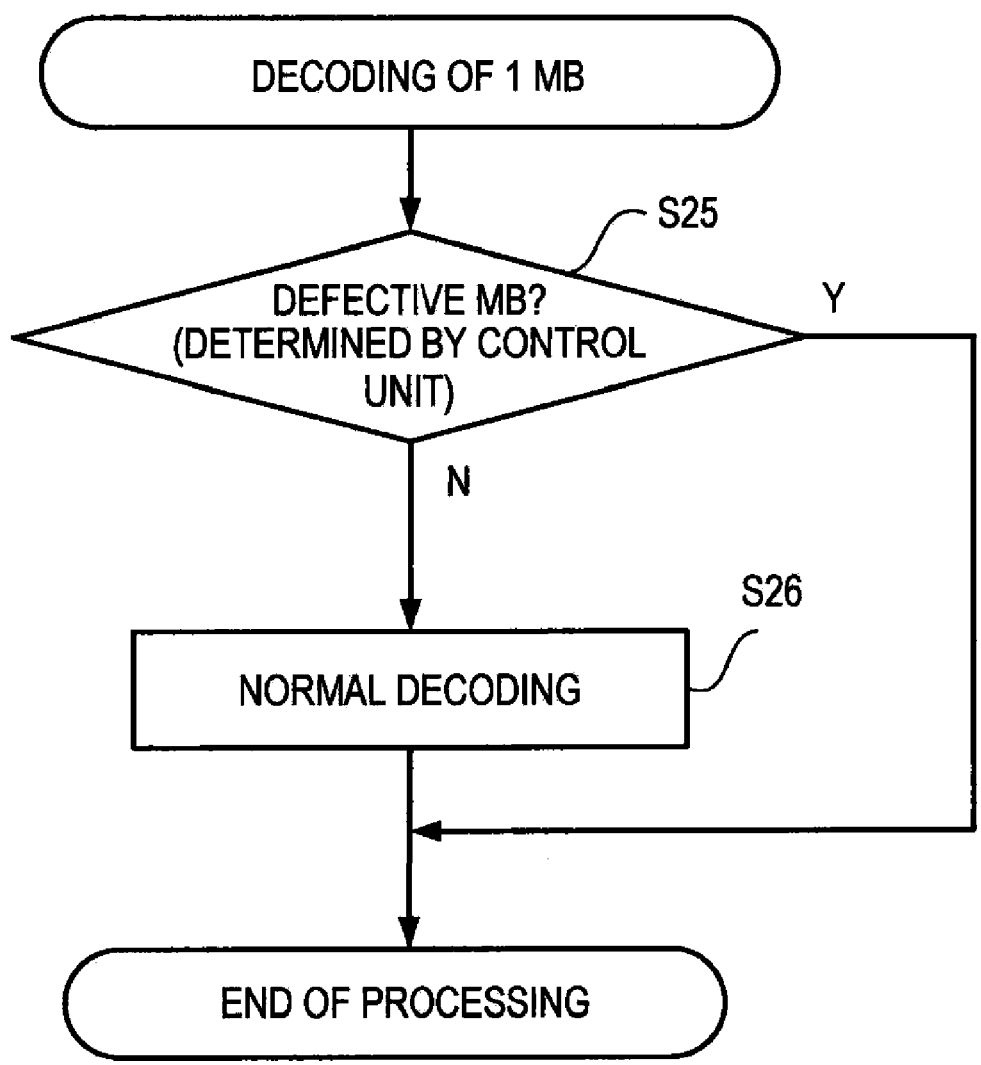
FIG. 8 illustrates a flowchart of decoding on a macroblock in FIG. 7.

Referring to FIGS. 7 and 8, the following will describe flowcharts of decoding a picture by the decoding unit 11 according to the first embodiment. FIG. 7 illustrates a flowchart of the overall processing of decoding of a picture. In FIG. 7, when decoding of a picture is started, a macroblock (MB) is first decoded in step S20. Decoding of a macroblock will be described in FIG. 8. As described above, in this processing, error concealment is performed on an image degradation block and a defective block in an image referenced by decoding.

Next, in step S21, it is determined whether an error has been detected or not. When an error has not been detected, the process immediately advances to step S23. When an error has been detected, in step S22, the error concealment target position information holding unit 15 stores a state in which an error concealment target includes, for example, the position of a decoded image degradation block, which is empirically determined, and reaches a recovery position. After that, in step S23, it is determined whether all macroblocks have been decoded or not in a picture. When all the macroblocks have not been decoded, the processing from step S20 is repeated. When all the macroblocks have been decoded, decoding of the picture is completed. The error concealment target is determined in step S22 by the control section 20 in the decoding unit 11.

FIG. 8 illustrates a flowchart showing decoding of a macroblock in step S20 of FIG. 7. In FIG. 8, when the processing is started, it is first determined whether a current decoding target is a defective macroblock or not in step S25. When the target is a defective macroblock, decoding of the macroblock is immediately completed. When the target is not a defective macroblock, normal decoding is performed in step S26, and then decoding of the macroblock is completed. In the first embodiment, error concealment is performed as described above when an error is detected on a referenced image during normal decoding in step S26.

Figure 9:
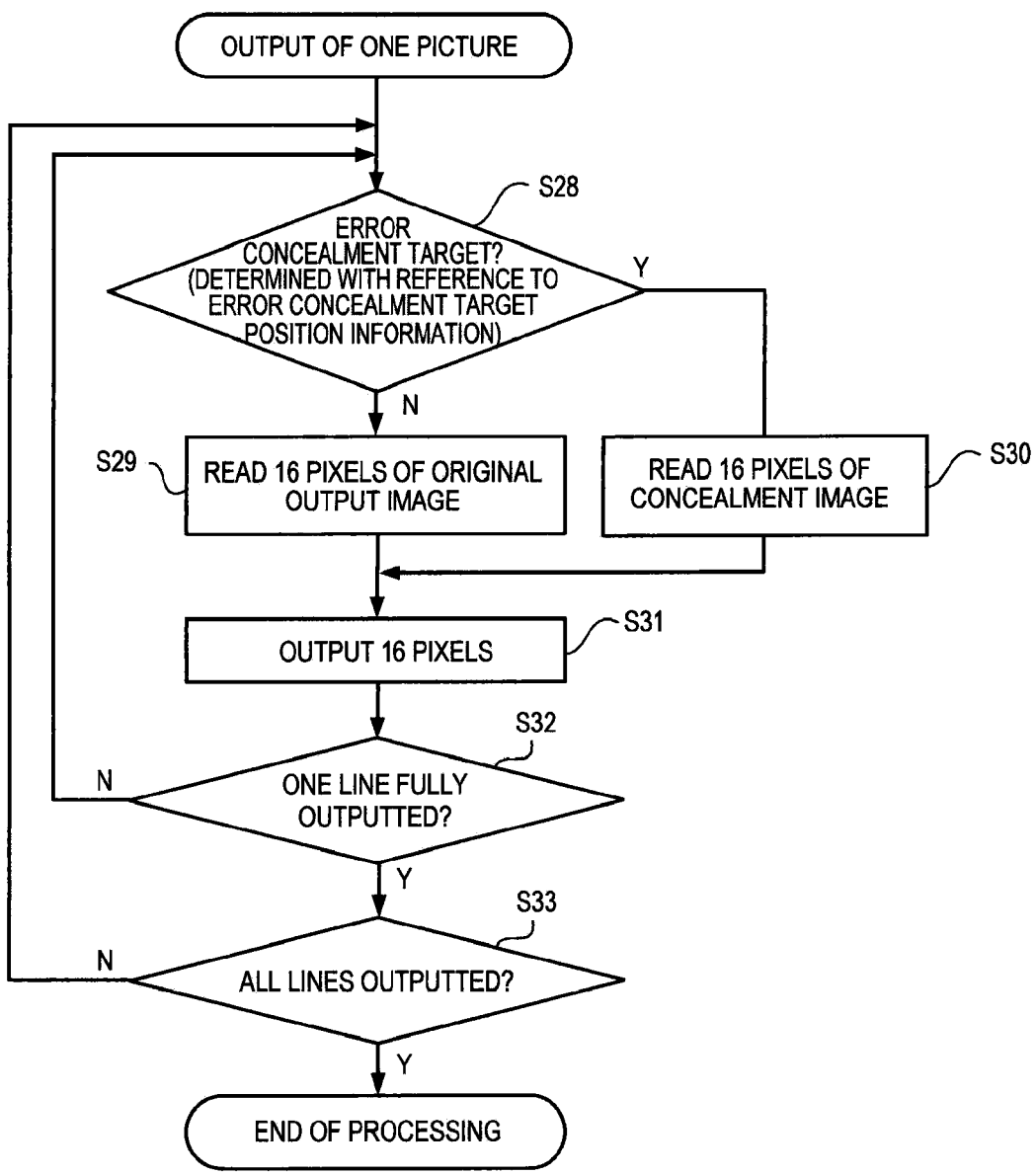
FIG. 9 illustrates a flowchart of the output of a picture according to the first embodiment.

FIG. 9 illustrates a flowchart of the output of a picture by the output unit 14 according to the first embodiment. In FIG. 9, when the processing is started, it is determined in step S28 whether or not an image to be outputted is a target of error concealment based on the stored contents of the error concealment target position information holding unit 15. When the image is not a target of error concealment, sixteen pixels of one line of the original output image are read in step S29. When the image is a target of error concealment, sixteen pixels of the image for error concealment are read in step S30 and the sixteen pixels are outputted in step S31. In step S32, it is determined whether the output of one line has been completed or not. When the output has not been completed, the processing in step S28 and the subsequent steps are repeated. When it is determined that the output of one line has been fully completed, it is determined whether all the lines have been outputted or not in step S33. When all the lines have not been outputted, the processing in step S28 and the subsequent steps are repeatedly performed on the subsequent line.

When it is determined that all the lines have been outputted, the output of the picture is completed.

Figure 10:
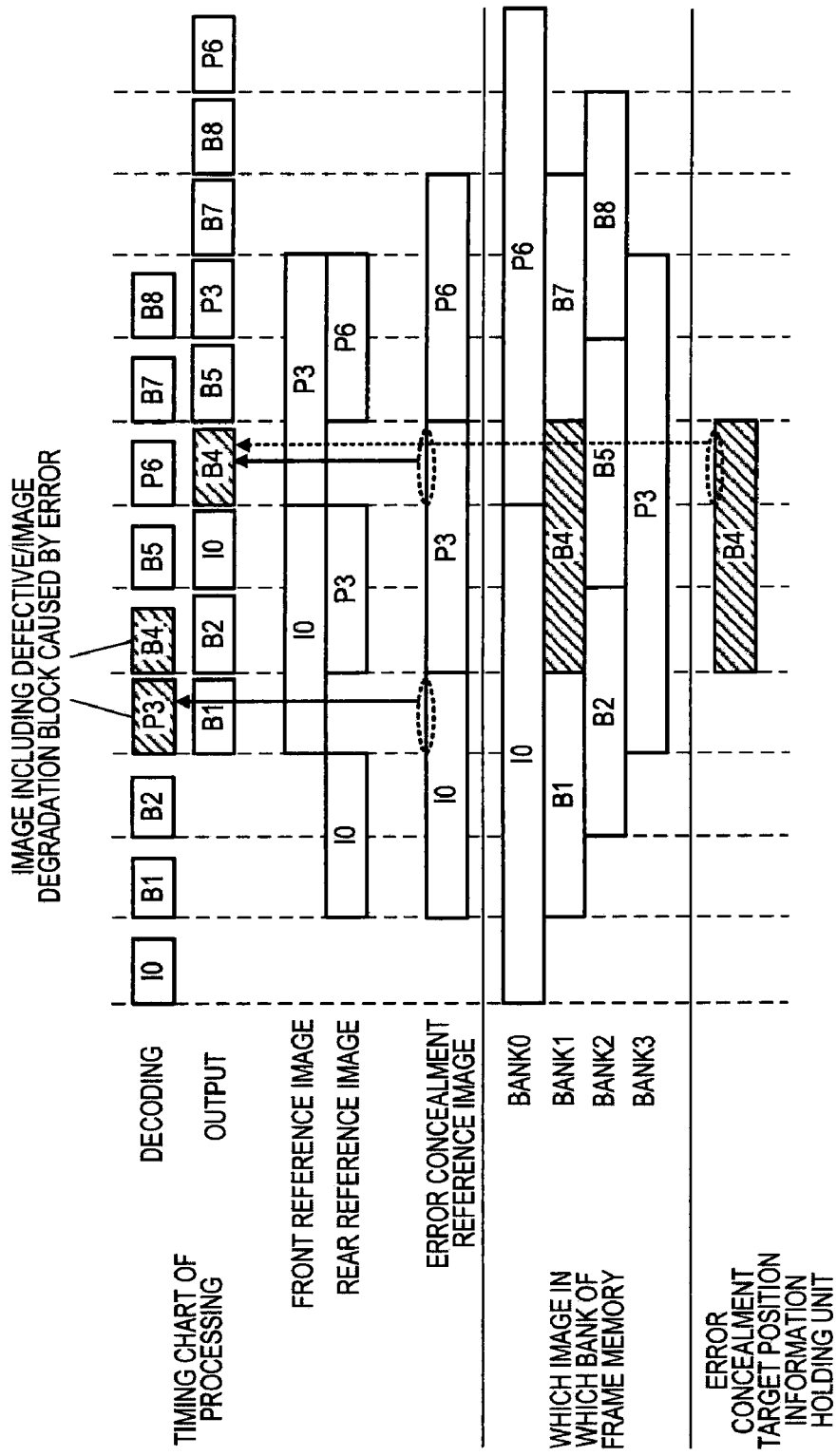
FIG. 10 illustrates a timing chart of decoding and image data output according to the first embodiment.

FIG. 10 illustrates a timing chart of decoding and image data output according to the first embodiment. In FIG. 10, a P3 picture referenced in decoding and a B4 picture not referenced in decoding are images that include errors. According to the first embodiment, in an image not referenced in decoding, reprocessing is not necessary on image degradation blocks and decoding is not necessary on defective blocks preceding a recovery position. Thus a throughput is increased accordingly and the images that include errors have a shorter decoding time. Consequently, the decoding time of the images that include errors is highly unlikely to exceed a predetermined time.

Figure 11:
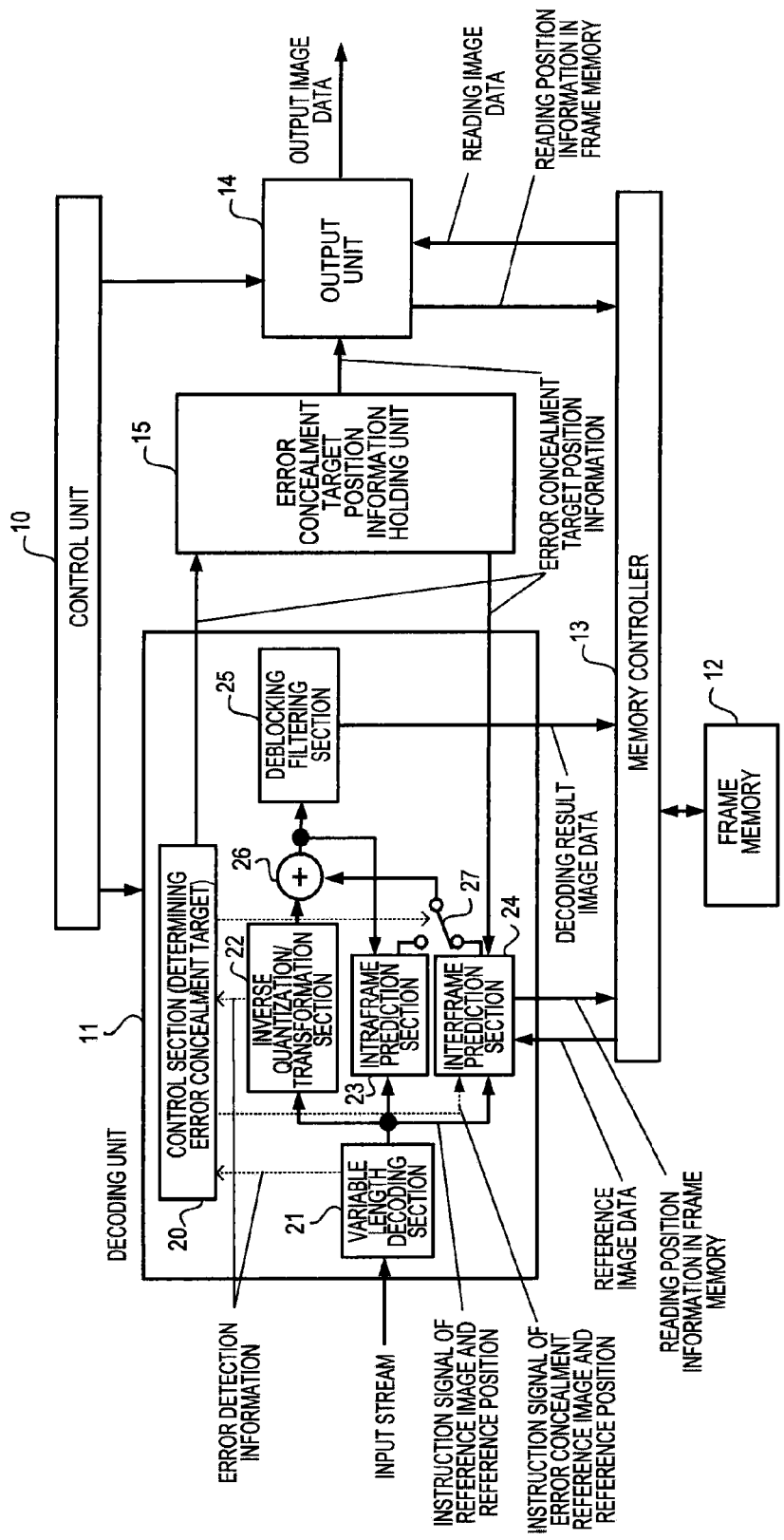
FIG. 11 illustrates a structural block diagram of a moving picture decoder according to a second embodiment.

A second embodiment will be described below. FIG. 11 illustrates a structural block diagram of a moving picture decoder according to the second embodiment. As compared with the first embodiment of FIG. 2, the basic configuration of FIG. 11 is similar to that of FIG. 2 but is different from FIG. 2 in that the error concealment target position information is outputted from an error concealment target position information holding unit 15 to an interframe prediction section 24 in a decoding unit 11. In the second embodiment, unlike the first embodiment, error concealment is not performed at all on an image referenced in decoding. Information about an error detection block, a defective block, and an image degradation block in an image where an error has been detected is outputted from a control section 20 in the decoding unit 11 to the error concealment target position information holding unit 15 as error concealment target position information. Further, the data is fed back not only to an output unit 14 but also to the interframe prediction section 24 in the decoding unit 11.

Thus, in the processing of the interframe prediction section 24, for example, even when the P3 picture referenced by the B4 picture in FIG. 23 includes image degradation blocks or defective blocks, error concealment is not performed on the P3 picture. Image data is outputted using other images in a frame memory 12, that is, an error concealment reference image for the P3 picture.

Control on the decoding unit, control on the output unit, and area release control on the frame memory 12 by a control unit 10 in the second embodiment are similar to FIGS. 3 to 5 of the first embodiment, except for a part of postprocessing for decoding in the control on the decoding unit.

Figure 12:
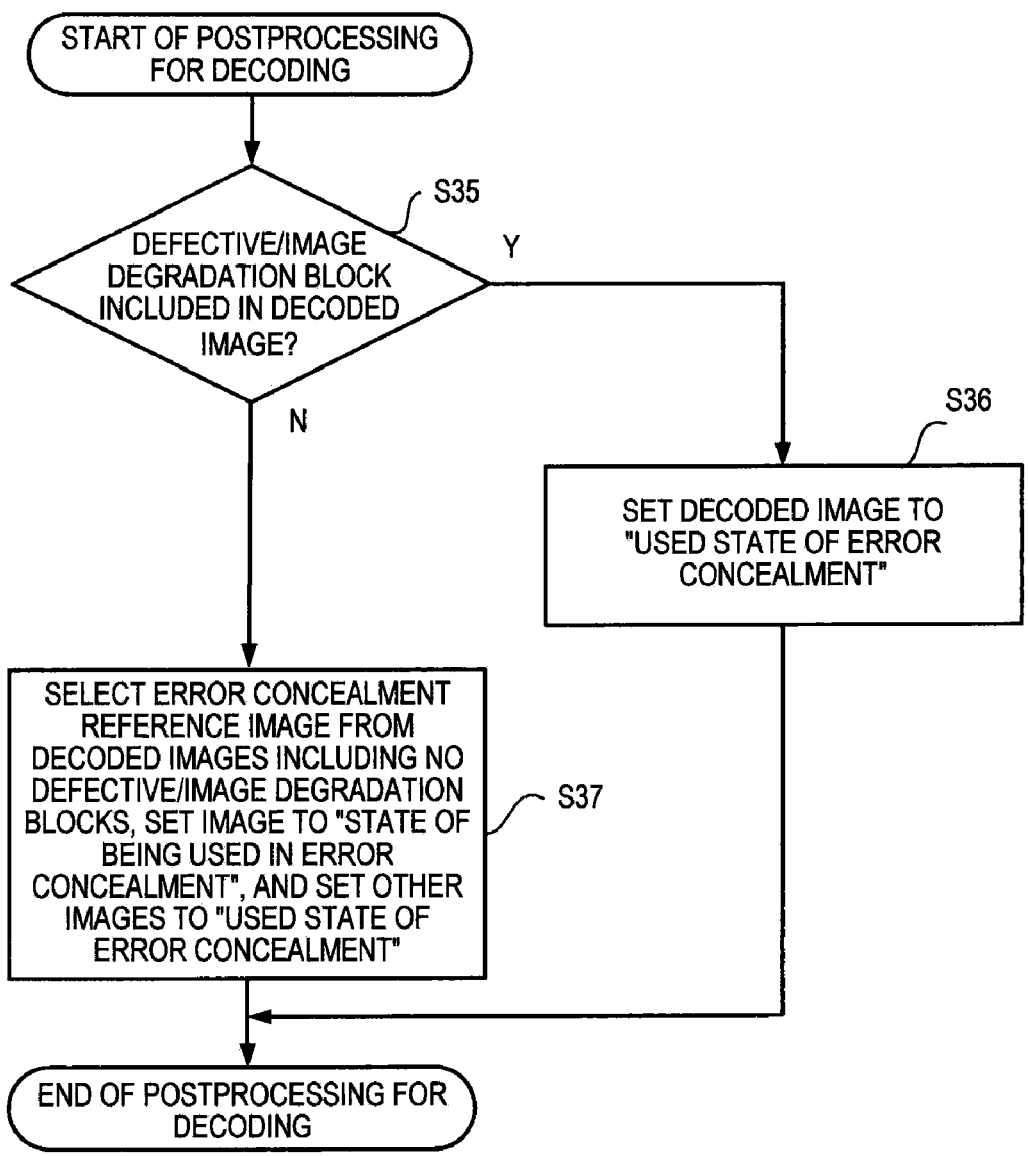
FIG. 12 illustrates a flowchart of postprocessing for decoding according to the second embodiment.

FIG. 12 illustrates a flowchart of postprocessing for decoding according to the second embodiment and corresponds to FIG. 6 of the first embodiment. In FIG. 12, when the processing is started, it is determined in step S35 whether or not a decoded image includes defective blocks or image degradation blocks. When the image includes defective blocks or image degradation blocks, a flag for the image is set to a used state of error concealment in step S36 to prevent the decoded image from being used for error concealment in the subsequent processing, and then the processing is completed immediately. When the image does not include any defective blocks or image degradation blocks, in step S37, an error concealment reference image is selected from decoded images not including any defective blocks or image degradation blocks, a flag indicating the possibility of use for error concealment is set to a used state of error concealment, flags for other images are set to a used state of error concealment, and then decoding is completed.

Thus even when an image which may be originally referenced in the subsequent decoding includes defective blocks or image degradation blocks, the image is not used in the processing of the interframe prediction section 24.

The contents of decoding of a picture in the second embodiment are similar to those of FIG. 7 of the first embodiment except for the contents of decoding of a macroblock of step S20 shown in FIG. 7.

Figure 13:
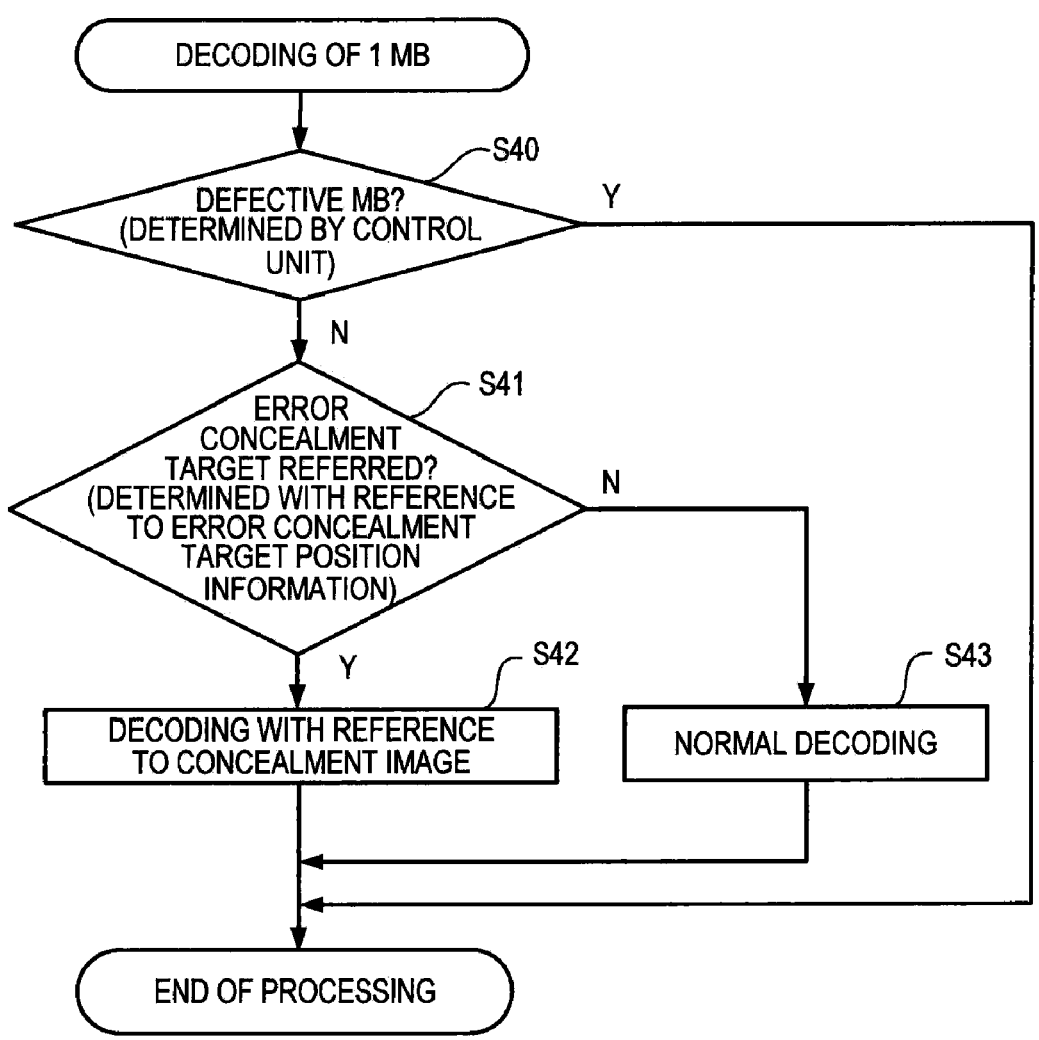
FIG. 13 illustrates a flowchart of decoding on a macroblock according to the second embodiment.

FIG. 13 illustrates a flowchart of decoding of a macroblock according to the second embodiment. In FIG. 13, when the processing is started, it is first determined in step S40 whether a processed block to be currently decoded is a defective macroblock or not by the control section 20 of FIG. 11. When the processed block is a defective macroblock, macroblock decoding process is completed without decoding that macroblock, as in FIG. 8 of the first embodiment.

When the processed macroblock is not a defective macroblock, it is determined in step S41 whether an image referenced by the processed image is an error concealment target or not with reference to the stored contents of the error concealment target position information holding unit 15. When the referenced image is an error concealment target, decoding is performed in step S42 with reference to an error concealment image corresponding to the referenced image. When the referenced image is not an error concealment target, normal decoding is performed in step S43 and then the macroblock decoding process is completed.

Figure 14:
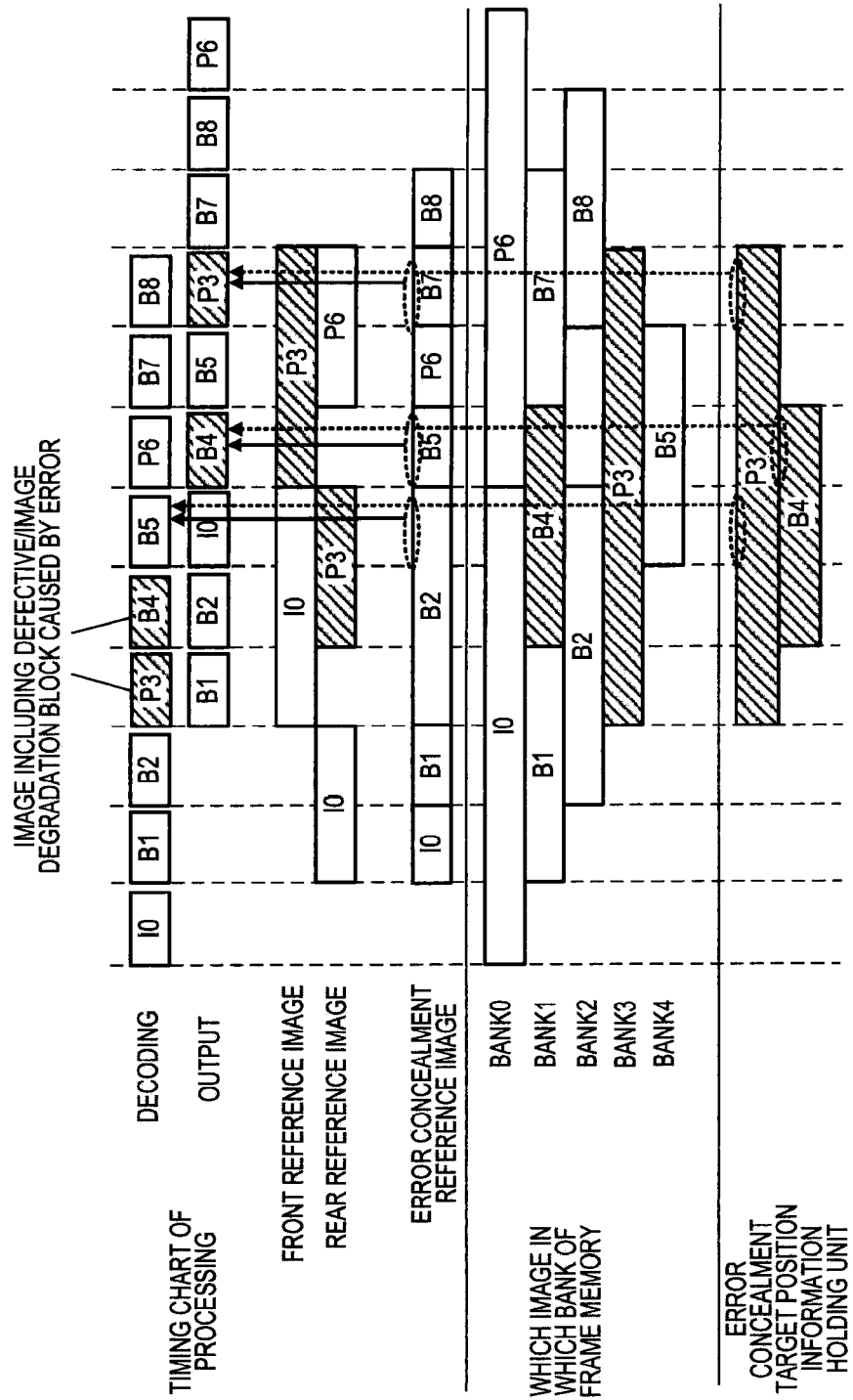
FIG. 14 illustrates a timing chart of decoding and image data output according to the second embodiment.
Figure 15:
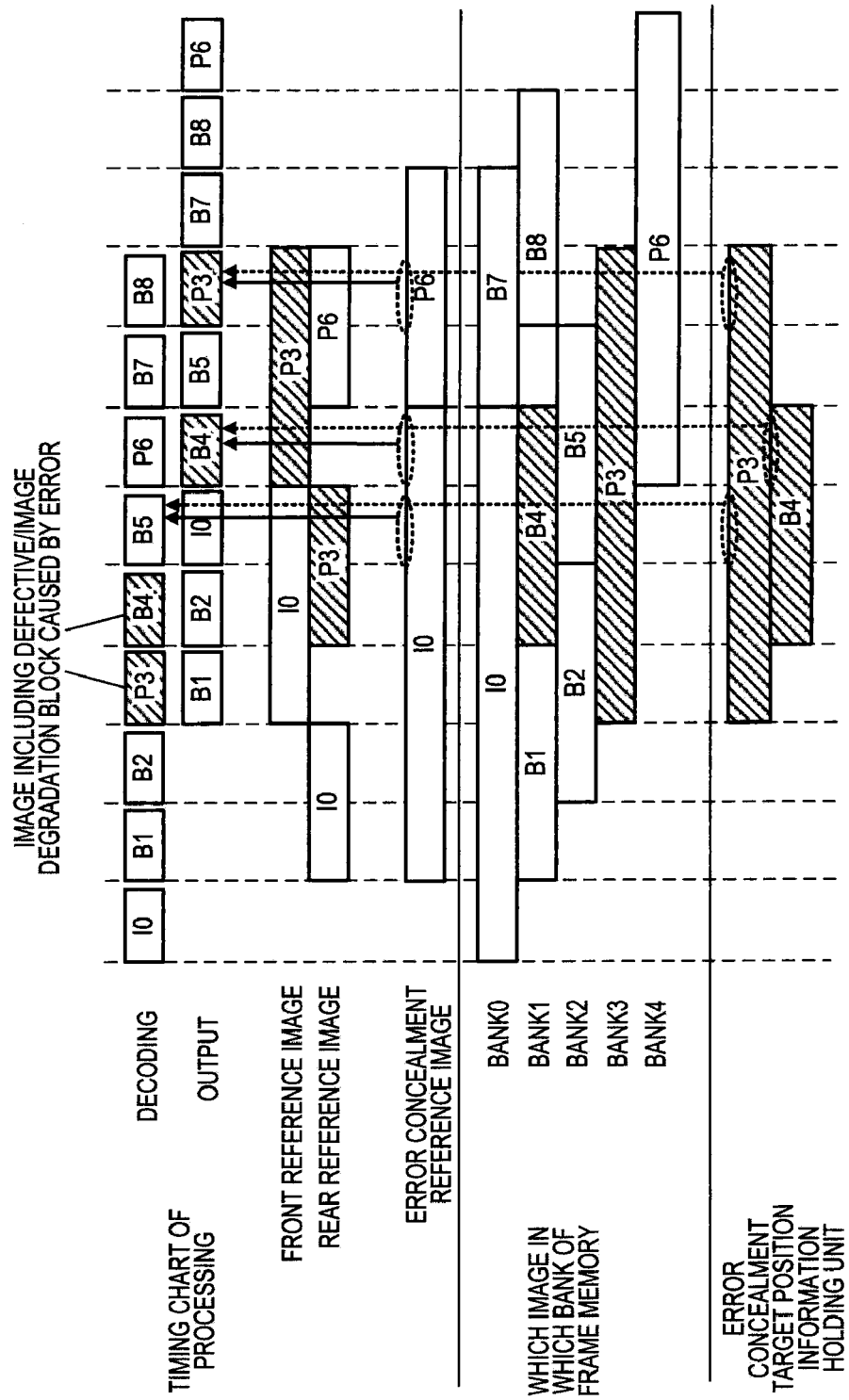
FIG. 15 illustrates a timing chart of a different example of decoding and image data output according to the second embodiment.
Figure 16:
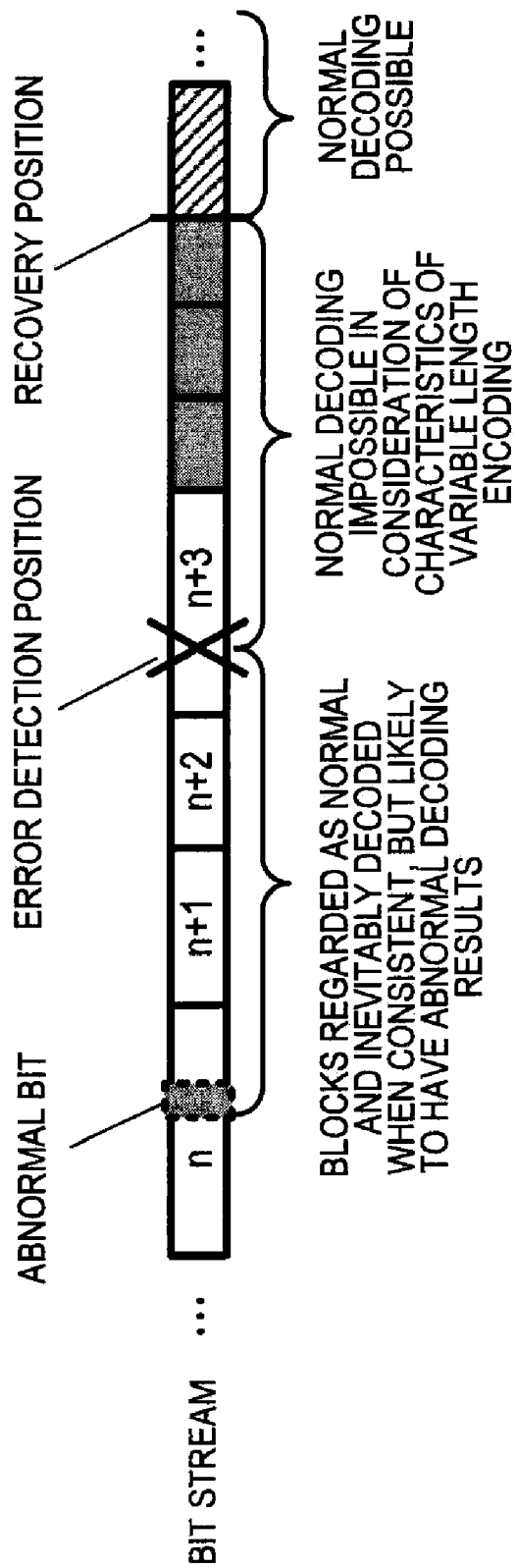
FIG. 16 illustrates an explanatory drawing of error detection in a bit stream.
Figure 17:
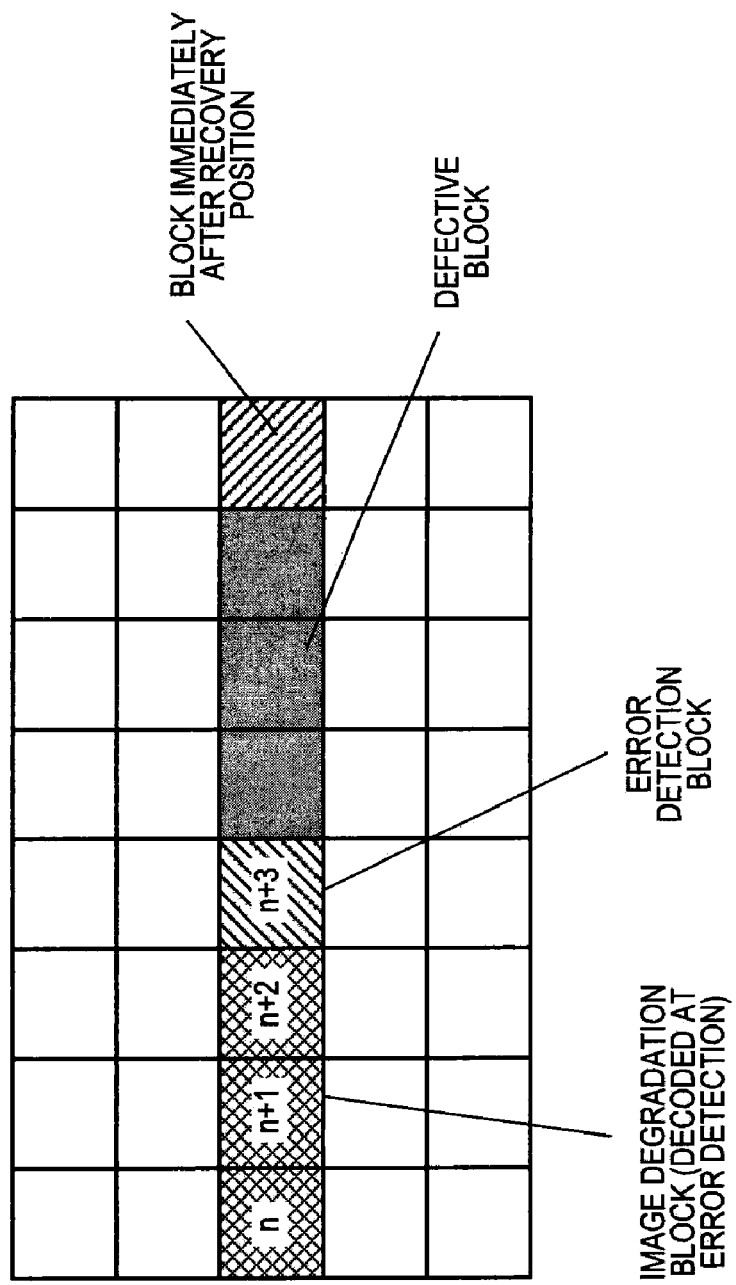
FIG. 17 illustrates an explanatory drawing of image degradation blocks and defective blocks in a piece of image data.
Figure 18:
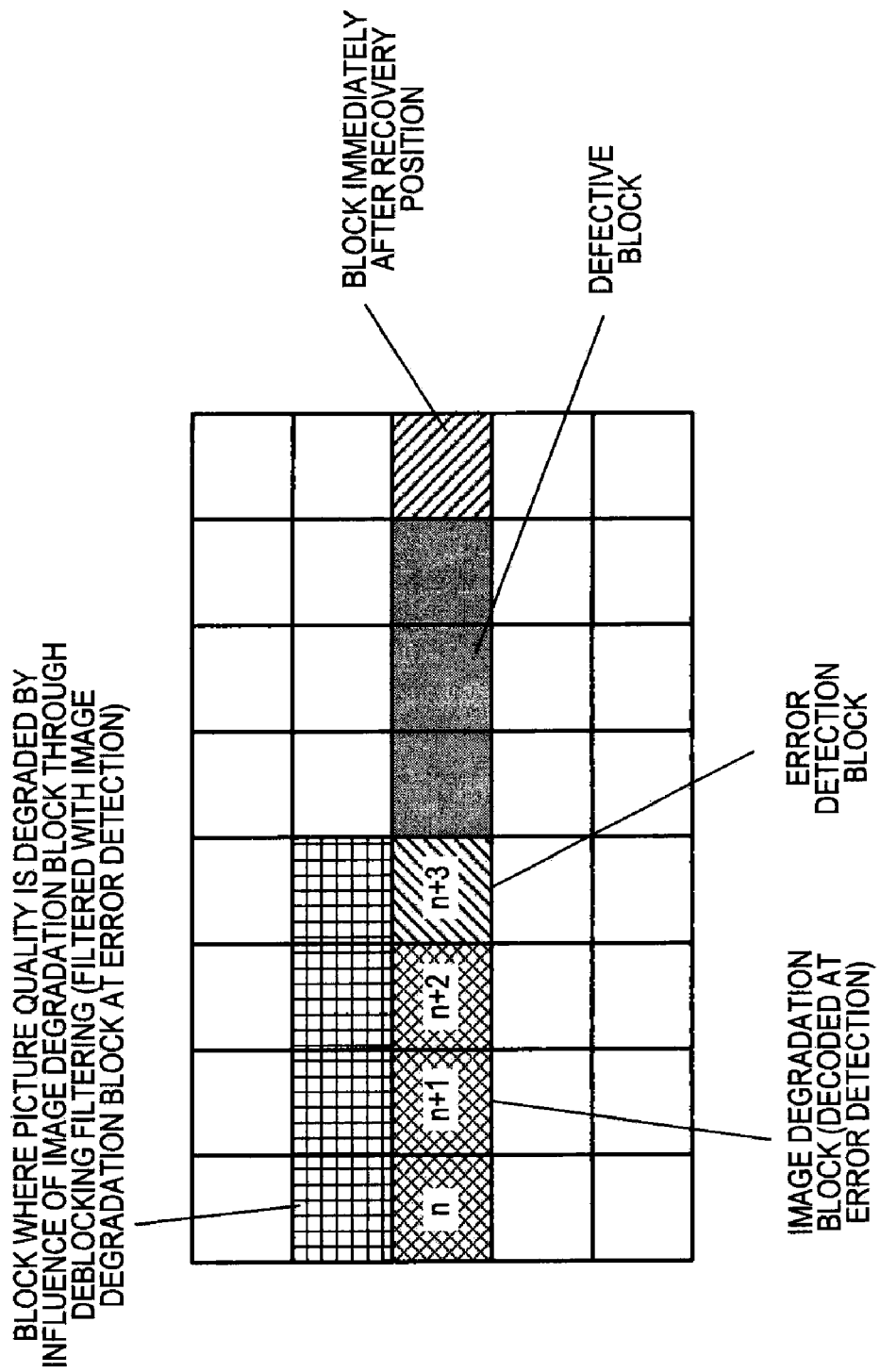
FIG. 18 illustrates an explanatory drawing of image degradation blocks increased by deblocking filtering.

FIGS. 14 and 15 illustrate timing charts of decoding and image data output according to the second embodiment. In FIG. 14, as in the first embodiment, a P3 picture and a B4 picture are images that include defective blocks or image degradation blocks which are caused by errors. The decoded image of the P3 picture is stored in a bank 3 of the frame memory as illustrated in FIG. 10. However, the image data is imperfect because the data includes image degradation blocks or defective blocks that have not been decoded. Further, error concealment target position information on the P3 picture is stored in the error concealment target position information holding unit 15.

Since the B4 picture similarly includes defective blocks or image degradation blocks, the image data of the B4 picture is stored in a bank 1 of the frame memory as imperfect image data and an error concealment target position corresponding to an error position is simultaneously stored in the error concealment target position information holding unit 15.

The subsequent B5 picture is an image without any errors. The B5 picture originally refers to the P3 picture as illustrated in FIG. 23. It is determined that the picture P3 includes defective blocks or image degradation blocks which are caused by errors, with reference to the stored contents of the error concealment target position information holding unit 15. The referenced image is switched to a B2 picture serving as an error concealment reference image without any errors, and then decoding is performed.

The picture B4 is outputted using a concealment reference image, that is, the B5 picture, by referring to the stored contents of the error concealment target position information holding unit 15. When the P3 picture is outputted, the stored contents of the error concealment target position information holding unit 15 are similarly referenced and image data is outputted using the image data of a B7 picture as an error concealment reference image.

Figure 24:
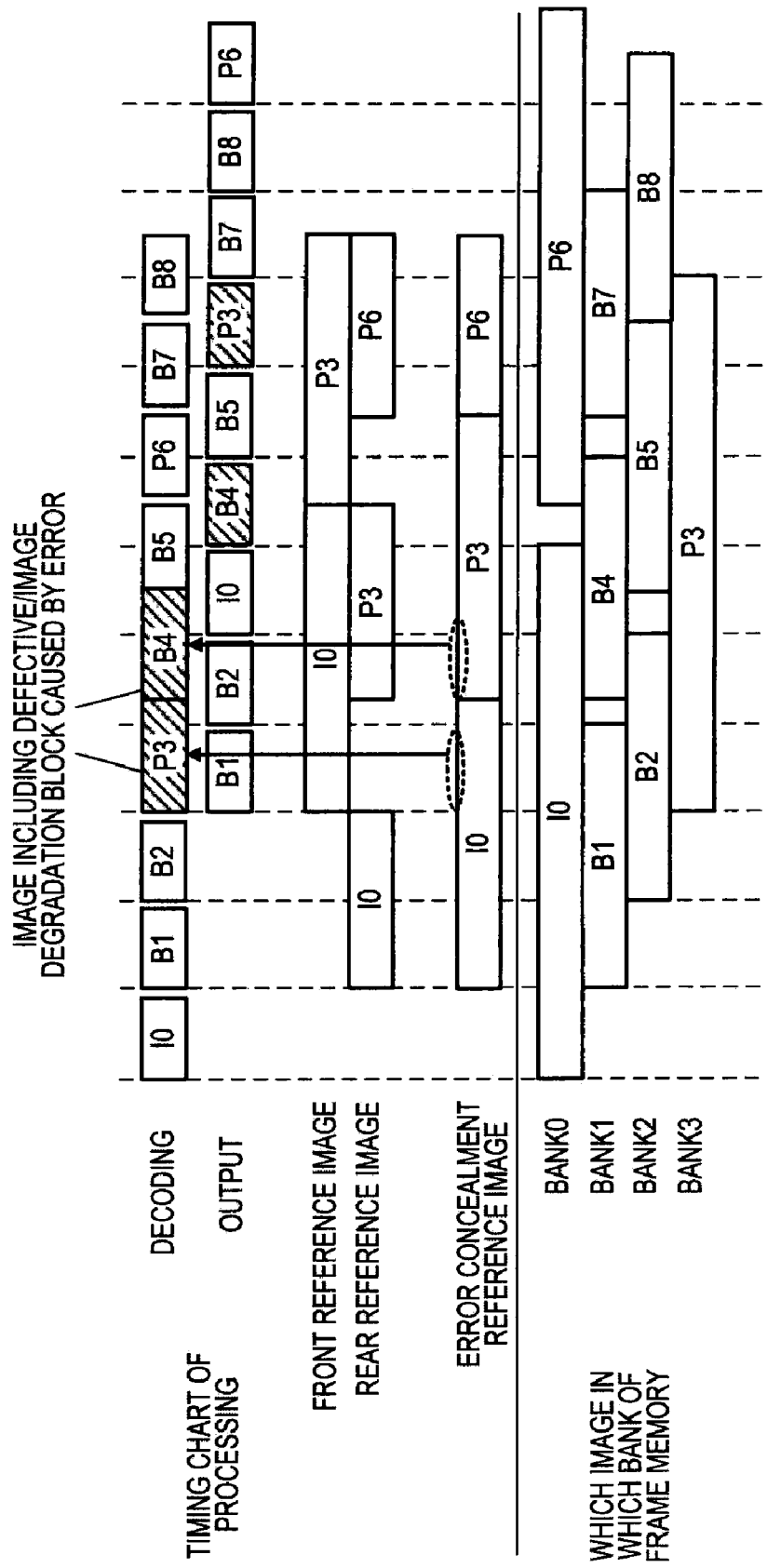
FIG. 24 illustrates a prior art example (1) of a timing chart of decoding and image data output.
Figure 25:
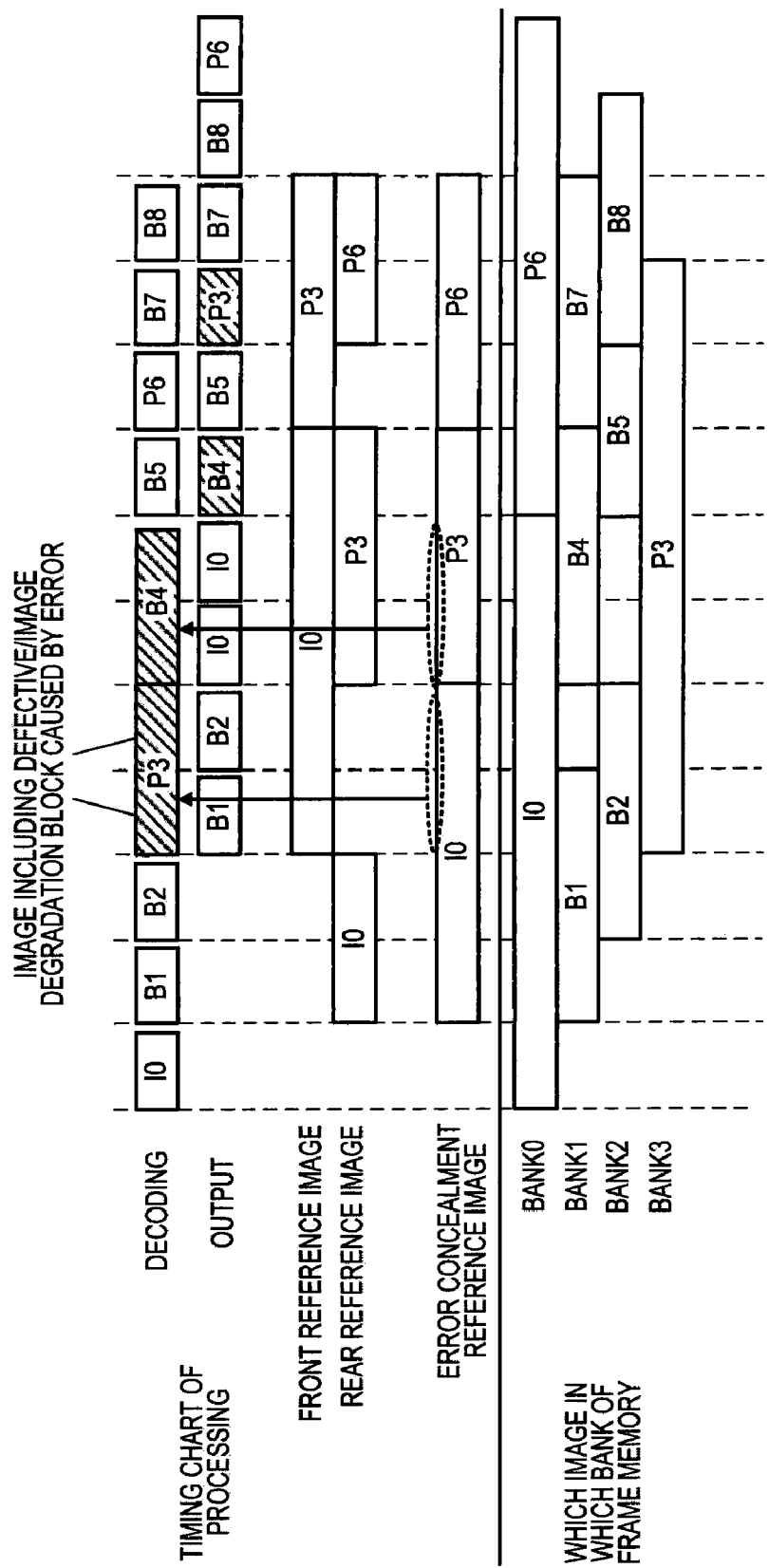
FIG. 25 illustrates a prior art example (2) of a timing chart of decoding and image data output.

Referring to FIG. 14, the following will examine a time for starting decoding on the picture B5. For example, in FIG. 24 of the prior art example and FIG. 10 of the first embodiment, the decoding result of the picture B5 is stored in a bank 2 of the frame memory. However, in FIG. 14, the picture B2 is used as an error concealment reference image, and thus the bank 2 cannot be released at this moment. The decoding result of the picture B5 is placed in the bank 4 and the number of images stored in the frame memory is temporarily increased by one, so that the number of banks has to be increased by one.

FIG. 15 illustrates a timing chart of a different example of decoding and image data output according to the second embodiment. In FIG. 14, among images not including any defective blocks or image degradation blocks which are caused by errors, the latest decoded image is used as an error concealment reference image. Whereas in FIG. 15, error concealment is performed by selecting an error concealment reference image from images to be originally used as reference images in decoding. In other words, until the B4 picture is outputted, an I0 picture, which is first used as a referenced image in decoding, is used as an error concealment reference image. From when the B7 picture is decoded and the B5 picture is outputted, the error concealment reference image is switched to the P6 picture to perform processing. Also in FIG. 15, a bank 4 is used to hold the decoding result of the P6 picture and the number of banks has to be increased by one as in FIG. 14.

As described above, in the second embodiment, error concealment is not performed during decoding even on referenced images to be used in decoding, and error concealment is not performed during decoding on all the pieces of image data including images not referenced during decoding. Further, when image data is outputted by the output unit 14, regarding an image including image degradation blocks or defective blocks which are caused by errors, image data on which error concealment has been consequently performed using an error concealment reference image is outputted to the outside. Thus, unlike the prior art, there is no possibility that a decoding time for a single piece of image data would exceed a predetermined time. Moreover, in error concealment on defective blocks, it is possible to eliminate processing including reading of data into the decoding unit and writing of decoding results into the frame memory, though such processing is necessary in the prior art. Further, it is possible to shorten a decoding time for a piece of image data.

According to at least one of the embodiments, in the case where an error is detected from a block in an image, it is possible to eliminate the need for reprocessing on image degradation blocks having been already decoded, perform error concealment on the image degradation blocks without increasing the amount of operations, and prevent a processing time from being increased by reprocessing on the image degradation blocks.

Further, according to at least one of the embodiments, even when quite a number of errors occur in a single piece of image data, it is possible to output image data, which has undergone error concealment, without exceeding a decoding time allocated to an image, thereby remarkably improving the practicality of the moving picture decoder.

What is claimed is:

1. A semiconductor device, comprising:
   a decoding section tod output second data obtained by decoding first data, the decoding section to output third data as the second data when detecting an error on a part of the first data and the part of the first data is referenced by a portion of the first data, the third data corresponding to a decoding result of the other part of the first data;
   a first memory to store the second data;
   a second memory to store error information on a part other than the part of the first data; and
   an output section to output the second data,
   wherein the output section outputs the third data stored in the first memory as the second data corresponding to the part of the first data.

2. The semiconductor device according to claim 1, wherein the second memory is further adapted to store information including previous part of the first data input before input of the part of the first data and following part of the first data after input of the part of the first data as error information on a part presumed to have data quality degradation.

3. The semiconductor device according to claim 2, wherein the output section outputs the third data as the second data corresponding to the part presumed to have data quality degradation based on the information.

4. The semiconductor device according to claim 1, wherein the semiconductor device includes a moving picture decoder, the first data is sequentially inputted image data, and the third data is a part of an error concealment image for the error or an image including the part presumed to have data quality degradation.

5. A method of controlling a semiconductor device, comprising:
   storing, in a memory, error information on an error of input data other than a first part of the input data referenced by a second part of the input data during decoding of the input data with a decoding result of the input data; and
   outputting a decoding result of a third part of the input data in the memory as the decoding result of the first part.

6. The method of controlling a semiconductor device according to claim 5, wherein the semiconductor device includes a moving picture decoder, the input data is sequentially inputted image data, and other data is made by using a part of an error concealment image for an image including the error.

* * * * *